US012243351B2

(12) United States Patent
Takeuchi et al.

(10) Patent No.: US 12,243,351 B2
(45) Date of Patent: Mar. 4, 2025

(54) GAZE ESTIMATION APPARATUS, GAZE ESTIMATION METHOD, MODEL GENERATION APPARATUS, AND MODEL GENERATION METHOD

(71) Applicant: OMRON Corporation, Kyoto (JP)

(72) Inventors: Yamato Takeuchi, Kyoto (JP); Shigenori Nagae, Kyoto (JP); Hatsumi Aoi, Kyoto (JP); Kazuo Yamamoto, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 345 days.

(21) Appl. No.: 17/789,234

(22) PCT Filed: Jan. 10, 2020

(86) PCT No.: PCT/JP2020/000643
§ 371 (c)(1),
(2) Date: Jun. 27, 2022

(87) PCT Pub. No.: WO2021/140642
PCT Pub. Date: Jul. 15, 2021

(65) Prior Publication Data
US 2023/0036611 A1  Feb. 2, 2023

(51) Int. Cl.
*G06V 40/18* (2022.01)
*G06V 10/82* (2022.01)
*G06V 10/98* (2022.01)

(52) U.S. Cl.
CPC .......... *G06V 40/193* (2022.01); *G06V 10/82* (2022.01); *G06V 10/993* (2022.01)

(58) Field of Classification Search
CPC ..... G06V 40/193; G06V 10/82; G06V 10/993
See application file for complete search history.

(56) References Cited

U.S. PATENT DOCUMENTS

2019/0043216 A1  2/2019  Yabuuchi et al.
2019/0303724 A1  10/2019  Linden
(Continued)

FOREIGN PATENT DOCUMENTS

JP    2019-28843 A    2/2019
WO    2019/154511 A1  8/2019

OTHER PUBLICATIONS

Erik Linden et al: "Learning to Personalize in Appearance-Based Gaze Tracking", arxiv.org, Cornell University Library, Submitted on Jul. 2, 2018, arXiv:1807.00664v3, Olin & Uris Libraries, Ithaca, NY 14853; Cited in EESR issued on Apr. 11, 2023 in a counterpart European patent application.
(Continued)

*Primary Examiner* — David F Dunphy
(74) *Attorney, Agent, or Firm* — METROLEX IP LAW GROUP, PLLC; Robert L. Scott, Esq.

(57) ABSTRACT

A gaze estimation apparatus according to one or more embodiments may estimate the gaze direction of a target person using calibration information including feature information about the gaze of the eyes of the target person looking in a predetermined direction and true value information indicating the true value for the predetermined direction, in addition to a target image including the eye(s) of the target person. The gaze estimation apparatus may thus estimate the gaze direction of the target person reflecting individual differences, and may allow estimation of the gaze direction of the target person with higher accuracy.

20 Claims, 10 Drawing Sheets

(56) References Cited

U.S. PATENT DOCUMENTS

2021/0049410 A1    2/2021  Dierkes et al.
2021/0174589 A1*  6/2021  Emery ................ G06F 3/04815
2022/0043509 A1*  2/2022  Dahl .................... G06V 20/597

OTHER PUBLICATIONS

The extended European search report (EESR) issued on Apr. 11, 2023 in a counterpart European patent application.
An English translation of the International Search Report ("ISR") of PCT/JP2020/000643 mailed on Mar. 10, 2020.
The Written Opinion("WO") of PCT/JP2020/000643 mailed on Mar. 10, 2020.

* cited by examiner

GAZE ESTIMATION APPARATUS, GAZE ESTIMATION METHOD, MODEL GENERATION APPARATUS, AND MODEL GENERATION METHOD

FIELD

The present disclosure relates to a gaze estimation apparatus, a gaze estimation method, a model generation apparatus, and a model generation method.

BACKGROUND

Various techniques have been developed to estimate the gaze direction of a target person. A known method for estimating the gaze direction uses corneal reflection. With the corneal reflection method, light from a light source generates a bright spot (Purkinje image) on the cornea, and the gaze is estimated based on the positional relationship between the generated bright spot and the pupil. This method allows highly accurate estimation of the gaze direction independently of the face orientation or other factors. However, this method relies on generation of a bright spot on the cornea for estimating the gaze direction. This limits the range in which the gaze direction can be estimated. Additionally, fluctuations in the head position may lower the accuracy of estimating the gaze direction.

Another known method for estimating the gaze direction uses the shape of the pupil. This method uses the apparent shape of the pupil that changes to an ellipse as the eyeball moves when the shape of the eyeball is a sphere and the contour of the pupil is a circle. More specifically, the method includes fitting the pupil shape of a target person included in a captured image and then estimating the gaze direction based on the inclination of the obtained pupil shape (ellipse) and the ratio of the long diameter to the short diameter of the pupil shape. This method involves simpler computations with less processing cost for estimating the gaze direction, thus increasing the speed of the process. However, any failure in accurately obtaining the pupil shape can lower the accuracy of estimating the gaze direction. For an image of the pupil included in a captured image with low resolution when, for example, the head is distant from an imaging device or when the imaging device has low performance, the fitting of the pupil shape can be difficult, thus causing difficulty in estimating the gaze direction.

Patent Literature 1 describes a method for estimating the gaze direction using a learned model such as a neural network. With the method described in Patent Literature 1, a partial image including the eye(s) of a target person is extracted from a captured image obtained by photographing the face of the target person, and the gaze direction of the target person is estimated based on the extracted partial image using the learned model. A system with the method described in Patent Literature 1 is expected to estimate the gaze direction in a robust and accurate manner against, for example, fluctuations in the position of the head of the target person.

CITATION LIST

Patent Literature

Patent Literature 1: Japanese Unexamined Patent Application Publication No. 2019-028843

SUMMARY

Technical Problem

The inventors have noticed issues associated with the known methods. The retina of a human has, in its center, the fovea centralis that contributes to vision in the high-definition central field of view. Thus, the gaze direction of a human can be defined by a line connecting the fovea centralis and the center of the pupil. The position of the fovea centralis varies depending on each individual person. More specifically, the fovea centralis may not be in the exact center of the retina but can vary depending on each individual person. The position of the fovea centralis of each individual person is difficult to determine using captured images obtained with an imaging device.

With the known methods, a model for estimating the gaze direction is built based on data obtained from a subject. However, the position of the fovea centralis differs individually between a target person for which the gaze direction is to be estimated in a target situation and the subject. The pupils that appear the same as in the captured image may correspond to a different gaze direction. The known methods may thus estimate the gaze direction with lower accuracy due to such individual differences in the position of the fovea centralis between persons.

One or more embodiments are directed to a technique for estimating the gaze direction of a target person with high accuracy.

One or more embodiments may have the structures described below.

A gaze estimation apparatus according to one or more embodiments may include a processor programmed or configured with instructions or logic to perform operations as elements including an information obtainer, an image obtainer, an estimation unit, and an output unit. The information obtainer obtains calibration information including feature information and true value information. The feature information is about a gaze of an eye of a target person looking in a predetermined direction. The true value information indicates a true value for the predetermined direction in which the eye of the target person is looking. The image obtainer obtains a target image including the eye of the target person. The estimation unit estimates a gaze direction of the target person included in the target image using a learned estimation model generated through machine learning. The learned estimation model is trained through the machine learning to output, in response to an input of calibration information for learning and a target image for learning obtained from a subject, an output value fitting answer information indicating a true value of a gaze direction of the subject included in the target image for learning. Estimating the gaze direction includes inputting the obtained target image and the obtained calibration information into the learned estimation model and performing a computational operation of the learned estimation model to obtain, from the learned estimation model, an output value corresponding to a result from estimating the gaze direction of a target person included in the target image. The output unit outputs information about the result from estimating the gaze direction of the target person.

The above-described structure estimates the gaze direction of the target person using the calibration information including the feature information and the true value information, in addition to the target image including the eye(s) of the target person. The feature information is information about the gaze of the eyes of the target person looking in a predetermined direction. The true value information indicates the true value for the predetermined direction. The feature information and the true value information are used to identify the features of the eyes defining the gaze in known directions (individual characteristics of the gaze of the target person) using true values. The above-described structure can estimate the gaze direction by additionally using the calibration information to calibrate variations in the gaze direction resulting from individual differences between the subject and the target person. More specifically, the above-described structure can estimate the gaze direction of the target person reflecting such individual differences. The above-described structure may allow estimation of the gaze direction of the target person with higher accuracy.

In the gaze estimation apparatus according to the above-described aspect, the calibration information may include the feature information and the true value information corresponding to each of a plurality of different predetermined directions. The above-described structure may allow the individual characteristics of the gaze direction of the target person to be identified more accurately based on calibration information for multiple different directions, and thus may allow estimation of the gaze direction of the target person with still higher accuracy.

In the gaze estimation apparatus according to the above-described aspect, the feature information and the true value information being included may include a calibration feature quantity about calibration derived from combining the feature information and the true value information being included. The learned estimation model may include a first extractor and an estimator. The performing the computational operation of the learned estimation model may include inputting the obtained target image into the first extractor and performing a computational operation of the first extractor to obtain, from the first extractor, an output value corresponding to a first feature quantity for the target image, and inputting the calibration feature quantity and the obtained first feature quantity into the estimator and performing a computational operation of the estimator. The above-described structure provides the learned estimation model that may allow appropriate estimation of the gaze direction of the target person based on the target image and the calibration information. The above-described structure may reduce the volume of calibration information and may reduce the information processing cost for estimating the gaze direction of the target person, thus may increase the speed of the information processing.

In the gaze estimation apparatus according to the above-described aspect, the feature information may include a second feature quantity associated with a reference image including the eye of the target person looking in the predetermined direction. The information obtainer may include a combiner. The obtaining the calibration information may include obtaining the second feature quantity, obtaining the true value information, and inputting the obtained second feature quantity and the true value information into the combiner and performing a computational operation of the combiner to obtain, from the combiner, an output value corresponding to the calibration feature quantity. The above-described structure may allow the computational operation through which the calibration feature quantity may be derived to be performed as a part of the process for obtaining the calibration information, instead of as a part of the process for estimating the gaze direction, which may reduce the processing cost for the estimation process. In the structure that repeatedly performs the process for obtaining the target image and the process for estimating the gaze direction, the process for obtaining the calibration information may be skipped and the calibration feature quantity derived in any preceding process may be reused during the repetitive computational operations. The above-described structure may reduce the processing cost for the computational operations, thus may increase the speed of the computational operations.

In the gaze estimation apparatus according to the above-described aspect, the information obtainer may further include a second extractor. The obtaining the second feature quantity may include obtaining the reference image, and inputting the obtained reference image into the second extractor and performing a computational operation of the second extractor to obtain, from the second extractor, an output value corresponding to the second feature quantity. The above-described structure may appropriately obtain the feature information (second feature quantity) representing the features of the eyes of the target person looking in a predetermined direction.

In the gaze estimation apparatus according to the above aspect, the learned estimation model may include a first extractor and an estimator. The performing the computational operation of the learned estimation model may include inputting the obtained target image into the first extractor and performing a computational operation of the first extractor to obtain, from the first extractor, an output value corresponding to a first feature quantity for the target image, and inputting the feature information, the true value information, and the obtained first feature quantity into the estimator and performing a computational operation of the estimator. This structure provides the learned estimation model that allows appropriate estimation of the gaze direction of the target person based on the target image and the calibration information.

In the gaze estimation apparatus according to the above aspect, the feature information may include a second feature quantity associated with a reference image including the eye of the target person looking in the predetermined direction. The information obtainer may include a second extractor. The obtaining the calibration information may include obtaining the reference image, inputting the obtained reference image into the second extractor and performing a computational operation of the second extractor to obtain, from the second extractor, an output value corresponding to a second feature quantity, and obtaining the true value information. This structure can appropriately obtain the feature information (second feature quantity) representing the features of the eyes of the target person looking in a predetermined direction. In the structure that repeatedly performs the process for obtaining the target image and the process for estimating the gaze direction, the process for obtaining calibration information may be skipped and a second feature quantity derived in any preceding process may be reused during the repetitive computational operations. This structure reduces the processing cost for the computational operations for identifying the gaze direction of the target person, thus increasing the speed of the computational operations.

In the gaze estimation apparatus according to the above aspect, the feature information may include a reference image including the eye of the target person looking in the predetermined direction. The learned estimation model may include a first extractor, a second extractor, and an estimator. The performing the computational operation of the learned estimation model may include inputting the obtained target image into the first extractor and performing a computational operation of the first extractor to obtain, from the first extractor, an output value corresponding to a first feature quantity for the target image, inputting the reference image into the second extractor and performing a computational operation of the second extractor to obtain, from the second extractor, an output value corresponding to a second feature quantity for the reference image, and inputting the obtained first feature quantity, the obtained second feature quantity, and the true value information into the estimator and performing a computational operation of the estimator. This structure provides the learned estimation model that allows appropriate estimation of the gaze direction of the target person based on the target image and the calibration information.

In the gaze estimation apparatus according to the above aspect, the learned estimation model may include a first converter and an estimator. The performing the computational operation of the learned estimation model may include inputting the target image into the first converter and performing a computational operation of the first converter to obtain, from the first converter, an output value corresponding to a first heat map representing a gaze direction of the target person, and inputting the obtained first heat map, the feature information, and the true value information into the estimator and performing a computational operation of the estimator. This structure provides the learned estimation model that allows appropriate estimation of the gaze direction of the target person based on the target image and the calibration information.

In the gaze estimation apparatus according to the above-described aspect, the feature information may include a second heat map representing the gaze direction of an eye in the predetermined direction. The second heat map may be derived from a reference image including the eye of the target person looking in the predetermined direction. The information obtainer may include a second converter. The obtaining the calibration information may include obtaining the reference image, inputting the obtained reference image into the second converter and performing a computational operation of the second converter to obtain, from the second converter, an output value corresponding to the second heat map, obtaining the true value information, and converting the true value information into a third heat map associated with a true value for the predetermined direction. The inputting the first heat map, the feature information, and the true value information into the estimator may include inputting the first heat map, the second heat map, and the third heat map into the estimator. The above-described structure uses a common heat map format as the data format used at the input end to simplify the structure of the estimator, thus may allow the estimator to easily integrate relevant pieces of information (the feature information, the true value information, and the target image) and to have higher estimation accuracy.

In the gaze estimation apparatus according to the above-described aspect, the obtaining the target image may be repeatedly performed by the image obtainer. The estimating the gaze direction of the target person may be repeatedly performed by the estimator. This structure may allow continuous estimation of the gaze direction of the target person.

In the gaze estimation apparatus according to the above aspect, the information obtainer may obtain the calibration information by measuring a gaze of the target person with a sensor after outputting an instruction to the target person to look in the predetermined direction. This structure can appropriately and easily obtain calibration information reflecting the characteristics of the gaze of the target person.

A model generation apparatus according to one or more embodiments may generate a learned estimation model usable in the gaze estimation apparatus according to the above-described aspects. For example, a model generation apparatus according to one or more embodiments may include a first obtainer, a second obtainer, and a machine learning unit. The first obtainer obtains calibration information for learning including feature information for learning and true value information for learning. The feature information is about a gaze of an eye of a subject looking in a predetermined direction. The true value information indicates a true value for the predetermined direction in which the eye of the subject is looking. The second obtainer obtains a plurality of learning datasets. Each of the plurality of learning datasets includes a target image for learning including the eye of the subject and answer information indicating a true value for a gaze direction of the subject included in the target image for learning. The machine learning unit performs machine learning of an estimation model using the obtained plurality of learning datasets. The machine learning includes training the estimation model to output, in response to an input of the target image for learning and calibration information for learning, an output value fitting a corresponding piece of the answer information for each of the plurality of learning datasets.

Another implementation of the gaze estimation apparatus and the model generation apparatus according to the above-described aspects may be an information processing method, a program, or a storage medium storing the program readable by, for example, a computer for implementing the components of the gaze estimation apparatus or the model generation apparatus. The computer-readable storage medium herein includes a medium storing a program or other information in an electrical, magnetic, optical, mechanical, or chemical manner. A gaze estimation system in one or more embodiments may include the gaze estimation apparatus and the model generation apparatus according to any of the above-described or other aspects.

For example, a gaze estimation method according to one or more embodiments is an information processing method implementable by a computer. The method includes obtaining calibration information, obtaining a target image, estimating a gaze direction of a target person, and outputting information. The obtaining calibration information includes obtaining calibration information including feature information and true value information. The feature information is about a gaze of an eye of the target person looking in a predetermined direction. The true value information indicates a true value for the predetermined direction in which the eye of the target person is looking. The obtaining a target image includes obtaining a target image including the eye of the target person. The estimating a gaze direction of a target person includes estimating a gaze direction of the target person included in the target image using a learned estimation model generated through machine learning. The learned estimation model is trained through the machine learning to output, in response to an input of calibration information for learning and a target image for learning obtained from a subject, an output value fitting answer information indicating a true value of a gaze direction of the subject included in the target image for learning. The calibration information for learning is the same type of information as the calibration information. The target image for learning is the same type of image as the target image. The estimating the gaze direction includes inputting the obtained target image and the obtained calibration information into the learned estimation model and performing a computational operation of the learned estimation model to obtain, from the learned estimation model, an output value corresponding to a result from estimating the gaze direction of a target person included in the target image. The outputting information includes outputting information about the result from estimating the gaze direction of the target person.

For example, a model generation method according to one or more embodiments is an information processing method implementable by a computer. The method includes obtaining calibration information, obtaining a plurality of learning datasets, and performing machine learning. The obtaining calibration information includes obtaining calibration information for learning including feature information for learning and true value information for learning. The feature information is about a gaze of an eye of a subject looking in a predetermined direction. The true value information indicates a true value for the predetermined direction in which the eye of the subject is looking. The obtaining a plurality of learning datasets includes obtaining a plurality of learning datasets each including a target image for learning including the eye of the subject and answer information indicating a true value for a gaze direction of the subject included in the target image for learning. The performing machine learning includes performing machine learning of an estimation model using the obtained plurality of learning datasets. The machine learning includes training the estimation model to output, in response to an input of the target image for learning and calibration information for learning, an output value fitting a corresponding piece of the answer information for each of the plurality of learning datasets.

The technique according to one or more embodiments may allow estimation of the gaze direction of a target person with high accuracy.

DETAILED DESCRIPTION

An embodiment of the present invention (hereafter, the present embodiment) will now be described with reference to the drawings. The present embodiment described below is a mere example of the present invention in all aspects. The embodiment may be variously modified or altered without departing from the scope of the present invention. More specifically, the present invention may be implemented as appropriate using the configuration specific to each embodiment. Although data used in the present embodiment is described in a natural language, such data may be specifically defined using any computer-readable language, such as a pseudo language, commands, parameters, or a machine language.

1. Example Use

Figure 1:
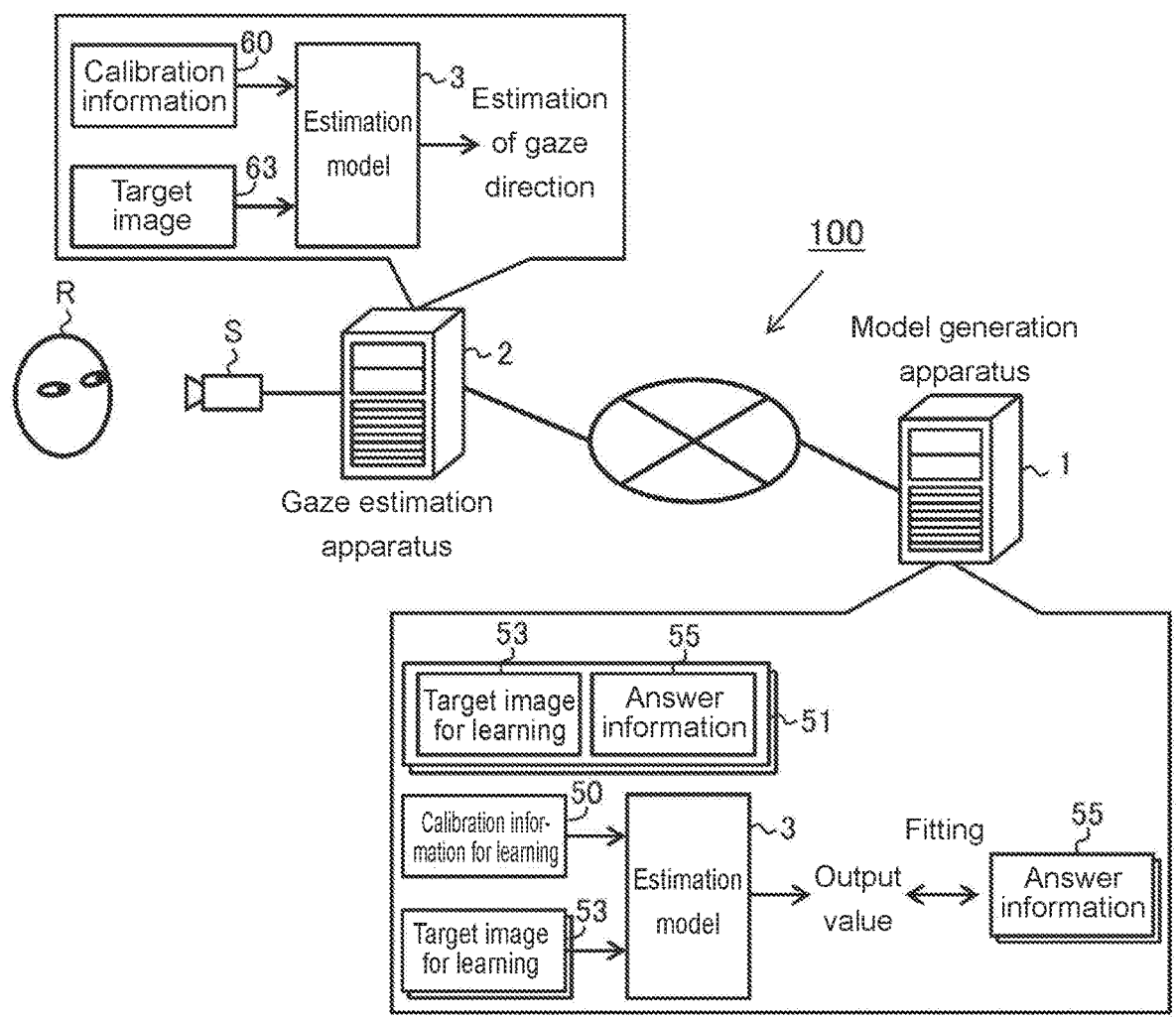
FIG. 1 is a schematic diagram illustrating an example situation in which one or more embodiments may be used.

FIG. 1 is a schematic diagram of an example situation in which an embodiment of the present invention is used. As shown in FIG. 1, a gaze estimation system 100 according to the present embodiment includes a model generation apparatus 1 and a gaze estimation apparatus 2.

The model generation apparatus 1 according to the present embodiment is a computer for generating a learned estimation model 3 usable to estimate the gaze direction of a target person. More specifically, the model generation apparatus 1 according to the present embodiment obtains calibration information 50 for learning including feature information for learning and true value information for learning. The feature information for learning is information about the gaze of the eyes of a subject looking in a predetermined direction. The true value information for learning is information about the true value for the predetermined direction in which the eyes of the subject are looking. The predetermined direction is a gaze direction known from its true value. A specific value indicating the predetermined direction may be determined as appropriate in each embodiment. The predetermined direction may be, for example, a direction that is likely to occur when the gaze direction of the target person is estimated.

The model generation apparatus 1 according to the present embodiment also obtains multiple learning datasets 51 each including a combination of a target image 53 for learning including the eye(s) of the subject and answer information 55. The answer information 55 indicates a true value for the gaze direction of the subject included in the target image 53 for learning. The multiple learning datasets 51 may also include learning datasets obtained from the subject looking in the predetermined direction, similarly to the calibration information 50 for learning. The term "for learning" refers to for being used in machine learning. The term "for learning" may not be used.

The model generation apparatus 1 according to the present embodiment uses the obtained multiple learning datasets 51 to perform machine learning of the estimation model 3. Performing machine learning includes training, for each learning dataset 51, the estimation model 3 through machine learning to output, in response to an input of the target image 53 for learning and the calibration information 50 for learning, an output value fitting the corresponding answer information 55. This generates the learned estimation model 3 that has learned to estimate the gaze direction of the subject included in the target image based on the calibration information and the target image. The term "learned" may be read as being trained.

The gaze estimation apparatus 2 is a computer for estimating the gaze direction of a target person R using the generated learned estimation model 3. More specifically, the gaze estimation apparatus 2 according to the present embodiment obtains, for the target person R, calibration information 60 including feature information and true value information. The calibration information 60 is the same type of data as the above calibration information 50 for learning obtained from the subject. The target person R may be the same person as the subject or may be a different person.

The feature information is information about the gaze of the eyes of the target person R looking in a predetermined direction. The feature information can be in any format when the feature information contains elements associated with the features of the eyes defining the gaze in the predetermined direction and may be determined as appropriate in each embodiment. For example, the feature information may include a reference image including the eye(s) of the target person looking in the predetermined direction, or may include the feature quantity of the gaze extracted from the reference image. The feature information is the same type of data as the above feature information for learning.

The true value information is information about the true value for the predetermined direction in which the eyes of the target person R are looking. The true value may be in any data format, or the gaze direction may be defined using any information about the gaze direction and may be selected as appropriate in each embodiment. The gaze direction may be defined using an angle such as an angle of elevation or an azimuth angle. The gaze direction may also be defined using a position gazed at within the field of view (hereafter also referred to as a gaze position). The angle or the gaze position may be indicated directly using a numerical value, or using a degree or probability expressed in a heat map. The true value information is the same type of data as the above feature information for learning.

The calibration information 60 including the feature information and the true value information refers to the calibration information 60 including the feature information and the true value information as separate pieces of data (e.g., in a separable format), or may refer to the calibration information 60 including information derived from combining the feature information and the true value information (e.g., a calibration feature quantity described below). The calibration information 60 has an example structure described later.

The gaze estimation apparatus 2 according to the present embodiment obtains a target image 63 including the eye(s) of the target person R. In the present embodiment, the gaze estimation apparatus 2 is connected to a camera S, from which the target image 63 can be obtained. The target image 63 may be any image including the eye(s) of the target person R. For example, the target image 63 may be an image directly obtained with the camera S, or may be a partial image extracted from the obtained image. The partial image may be obtained by, for example, extracting an area of at least one of the eyes from the image obtained with the camera S. The partial image may be extracted with known image processing.

The gaze estimation apparatus 2 according to the present embodiment then uses the learned estimation model 3 generated through the machine learning process described above to estimate the gaze direction of the eye(s) of the target person R included in the target image 63. Estimating the gaze direction includes inputting the obtained target image 63 and the obtained calibration information 60 into the learned estimation model 3, and performing a computational operation with the learned estimation model 3 to obtain an output value corresponding to the estimation result of the gaze direction of the eye(s) of the target person R included in the target image 63 from the learned estimation model 3. The gaze estimation apparatus 2 according to the present embodiment then outputs information about the estimation result of the gaze direction of the target person R.

In the present embodiment as described above, the gaze direction of the target person R is estimated using the calibration information 60 including the feature information and the true value information, in addition to the target image 63 including the eye(s) of the target person R. The feature information and the true value information are used to identify the features of the eyes defining the gaze in known directions (individual characteristics of the gaze of the target person R) using true values. The structure according to the present embodiment can estimate the gaze direction by additionally using the calibration information 60 to calibrate variations in the gaze direction resulting from individual differences between the subject and the target person R. More specifically, the structure can estimate the gaze direction of the target person R reflecting such individual differences. Thus, the gaze estimation apparatus 2 according to the present embodiment can estimate the gaze direction of the target person R with higher accuracy. The model generation apparatus 1 according to the present embodiment can generate the learned estimation model 3 that allows estimation of the gaze direction of the target person R with such high accuracy.

The structure according to the present embodiment may be used in any situations in which the gaze direction of the target person R is estimated. Example situations involving such estimation of the gaze direction include estimating the gaze direction of a driver driving a vehicle, estimating the gaze direction of a user communicating with a robot device, and estimating the gaze direction of a user through a user interface and then using the obtained estimation result as an input. The driver and the user are examples of the target person R. The estimation result of the gaze direction may be used in these situations as appropriate.

In the example of FIG. 1, the model generation apparatus 1 and the gaze estimation apparatus 2 are connected to one another through a network. The network may be selected as appropriate from, for example, the Internet, a wireless communication network, a mobile communication network, a telephone network, and a dedicated network. The method for communicating data between the model generation apparatus 1 and the gaze estimation apparatus 2 may be different from this and may be selected as appropriate in each embodiment. For example, data may be communicated between the model generation apparatus 1 and the gaze estimation apparatus 2 using a storage medium.

In the example of FIG. 1, the model generation apparatus 1 and the gaze estimation apparatus 2 are separate computers. However, the configuration of the gaze estimation system 100 according to the present embodiment may be different from this and may be selected as appropriate in each embodiment. For example, the model generation apparatus 1 and the gaze estimation apparatus 2 may be integrated into a single computer. In some embodiments, at least one of the model generation apparatus 1 or the gaze estimation apparatus 2 may include multiple computers.

2. Example Structure

Hardware Configuration
Model Generation Apparatus

Figure 2:
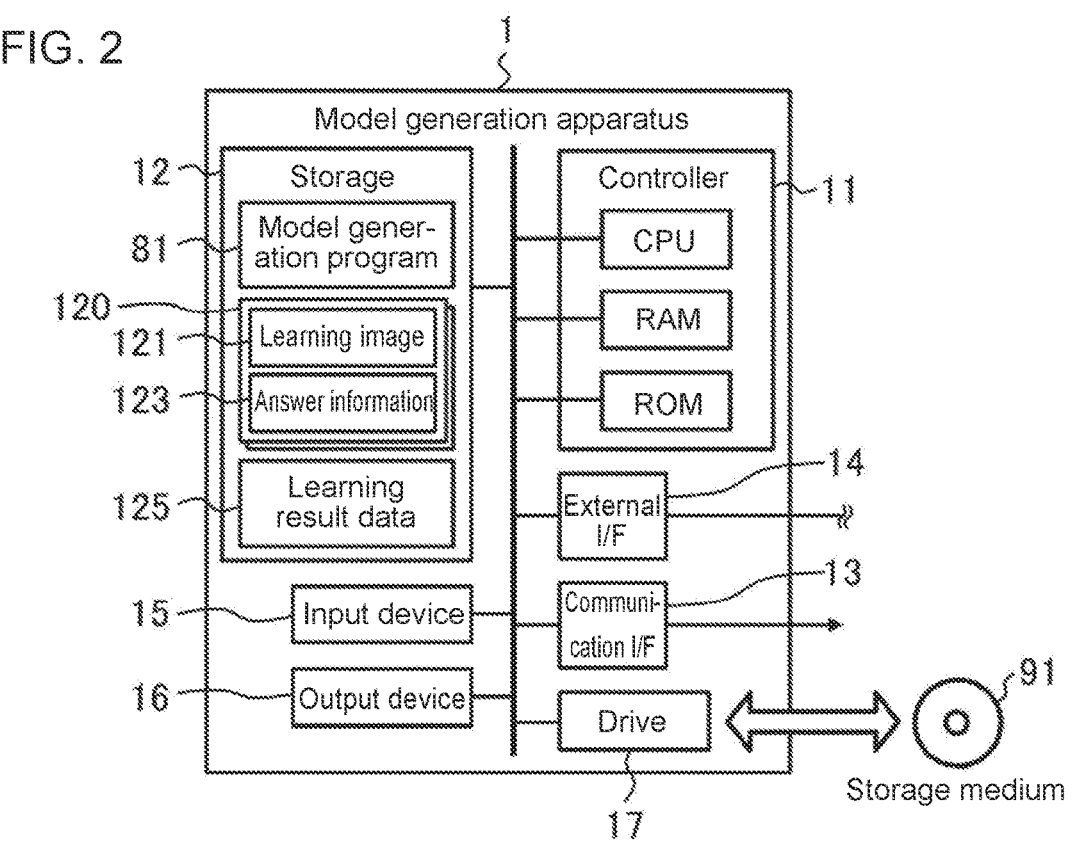
FIG. 2 is a schematic diagram illustrating a model generation apparatus according to one or more embodiments showing an example hardware configuration.

FIG. 2 is a schematic diagram of the model generation apparatus 1 according to the present embodiment showing its example hardware configuration. As shown in FIG. 2, the model generation apparatus 1 according to the present embodiment is a computer including a controller 11, a storage 12, a communication interface 13, an external interface 14, an input device 15, an output device 16, and a drive 17 that are electrically connected to one another. In FIG. 2, the communication interface and the external interface are abbreviated as a communication I/F and an external I/F.

The controller 11 includes, for example, a central processing unit (CPU) as a hardware processor, a random-access memory (RAM), and a read-only memory (ROM). The controller 11 performs information processing based on programs and various items of data. The storage 12, as an example of a memory, includes, for example, a hard disk drive or a solid-state drive. The storage 12 in the present embodiment stores various items of information such as a model generation program 81, multiple datasets 120, and learning result data 125.

The model generation program 81 causes the model generation apparatus 1 to perform information processing (FIG. 6) to generate the learned estimation model 3 through machine learning (described later). The model generation program 81 includes a series of commands for causing the information processing. Each dataset 120 includes a combination of a learning image 121 and answer information 123. The learning result data 125 represents information about the learned estimation model 3 generated through machine learning. In the present embodiment, the learning result data 125 results from the model generation program 81 being executed. This will be described in detail later.

The communication interface 13 is an interface for wired or wireless communication through a network, and may be a wired local area network (LAN) module or a wireless LAN module. The model generation apparatus 1 uses the communication interface 13 to communicate data with another information processing device with a network. The external interface 14 is an interface for connection to an external device and may be, for example, a universal serial bus (USB) port or a dedicated port. The types and the number of external interfaces 14 may be selected as appropriate. The model generation apparatus 1 may be connected to a camera for capturing a learning image 121 through at least one of the communication interface 13 or the external interface 14.

The input device 15 includes, for example, a mouse and a keyboard. The output device 16 includes, for example, a display and a speaker. An operator such as a user may operate the model generation apparatus 1 using the input device 15 and the output device 16.

The drive 17 is, for example, a compact disc (CD) drive or a digital versatile disc (DVD) drive for reading programs or other information stored in a storage medium 91. The storage medium 91 stores programs or other information in an electrical, magnetic, optical, mechanical, or chemical manner to allow a computer or another device or machine to read the stored programs or other information. At least either the above model generation program 81 or the multiple datasets 120 may be stored in the storage medium 91. The model generation apparatus 1 may obtain at least either the model generation program 81 or the multiple datasets 120 from the storage medium 91. In FIG. 2, the storage medium 91 is a disc storage, such as a CD or a DVD. However, the storage medium 91 is not limited to a disc storage. One example of the storage medium other than a disc storage is a semiconductor memory such as a flash memory. The drive 17 may be of any type selected as appropriate for the type of the storage medium 91.

For the specific hardware configuration of the model generation apparatus 1, components may be eliminated, substituted, or added as appropriate in each embodiment. For example, the controller 11 may include multiple hardware processors. Each hardware processor may include a microprocessor, a field-programmable gate array (FPGA), a digital signal processor (DSP), or other processors. The storage 12 may be the RAM and the ROM included in the controller 11. At least one of the communication interface 13, the external interface 14, the input device 15, the output device 16, or the drive 17 may be eliminated. The model generation apparatus 1 may include multiple computers. In this case, each computer may have the same or a different hardware configuration. The model generation apparatus 1 may also be an information processor dedicated to an intended service, or may be a general-purpose server or a general-purpose personal computer (PC).

2. Gaze Estimation Apparatus

Figure 3:
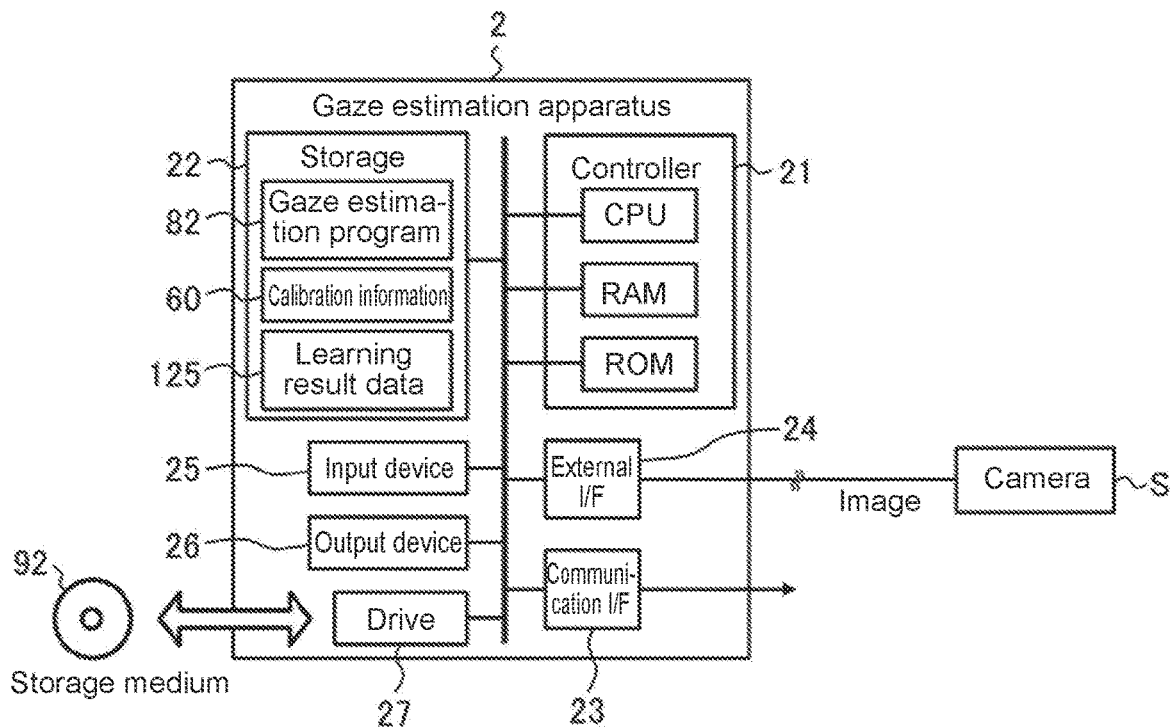
FIG. 3 is a schematic diagram illustrating a gaze estimation apparatus according to one or more embodiments showing a hardware configuration.

FIG. 3 is a schematic diagram of the gaze estimation apparatus 2 according to the present embodiment showing its hardware configuration. As shown in FIG. 3, the gaze estimation apparatus 2 according to the present embodiment is a computer including a controller 21, a storage 22, a communication interface 23, an external interface 24, an input device 25, an output device 26, and a drive 27 that are electrically connected to one another.

The components from the controller 21 to the drive 27 in the gaze estimation apparatus 2 and a storage medium 92 may have the same structures as the components from the controller 11 to the drive 17 in the above model generation apparatus 1 and the storage medium 91. The controller 21 includes, for example, a CPU as a hardware processor, a RAM, and a ROM, and performs various types of information processing operations based on programs and data. The storage 22 includes, for example, a hard disk drive or a solid-state drive. In the present embodiment, the storage 22 stores various items of information including a gaze estimation program 82, the calibration information 60, and the learning result data 125.

The gaze estimation program 82 causes the gaze estimation apparatus 2 to perform the information processing described later (FIG. 7) to estimate the gaze direction of the target person R included in the target image 63 using the learned estimation model 3. The gaze estimation program 82 includes a series of commands for causing the information processing. At least one of the gaze estimation program 82, the calibration information 60, or the learning result data 125 may be stored in the storage medium 92. The gaze estimation apparatus 2 may obtain, from the storage medium 92, at least one of the gaze estimation program 82, the calibration information 60, or the learning result data 125.

In the example of FIG. 3, the gaze estimation apparatus 2 is connected to the camera S (imaging device) through the external interface 24. The gaze estimation apparatus 2 can thus obtain the target image 63 from the camera S. The connection to the camera S may be performed with a method different from this example and may be selected as appropriate in each embodiment. When, for example, the camera S includes a communication interface, the gaze estimation apparatus 2 may be connected to the camera S through the communication interface 23. The camera S may be of any type selected as appropriate in each embodiment. The camera S may be, for example, a common RGB camera, a depth camera, or an infrared camera. The camera S may be positioned as appropriate to image the eyes of the target person R.

For the specific hardware configuration of the gaze estimation apparatus 2, components may be eliminated, substituted, or added as appropriate in each embodiment. For example, the controller 21 may include multiple hardware processors. Each hardware processor may be a microprocessor, an FPGA, a DSP, or other processors. The storage 22 may be the RAM and the ROM included in the controller 21. At least one of the communication interface 23, the external interface 24, the input device 25, the output device 26, or the drive 27 may be eliminated. The gaze estimation apparatus 2 may include multiple computers. In this case, each computer may have the same or a different hardware configuration. The gaze estimation apparatus 2 may be an information processing apparatus dedicated to an intended service, or may be a general-purpose server, a general-purpose PC, or a programmable logic controller (PLC).

Software Configuration
Model Generation Apparatus

Figure 4A:
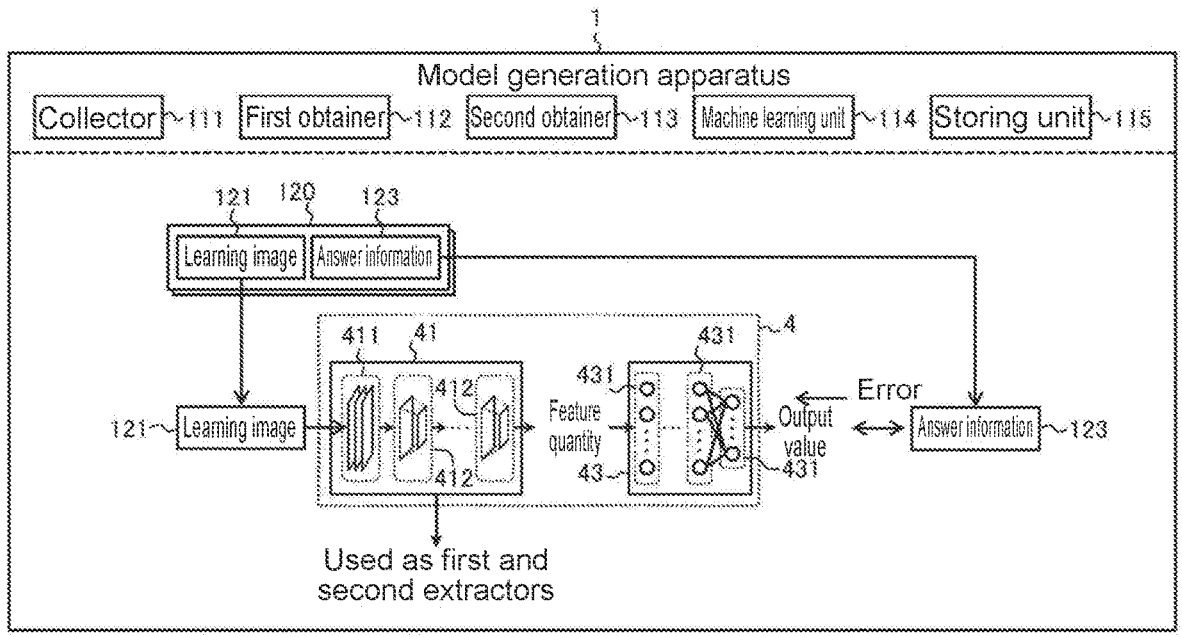
FIG. 4A is a schematic diagram further illustrating a model generation apparatus according to one or more embodiments showing an example software configuration.
Figure 4B:
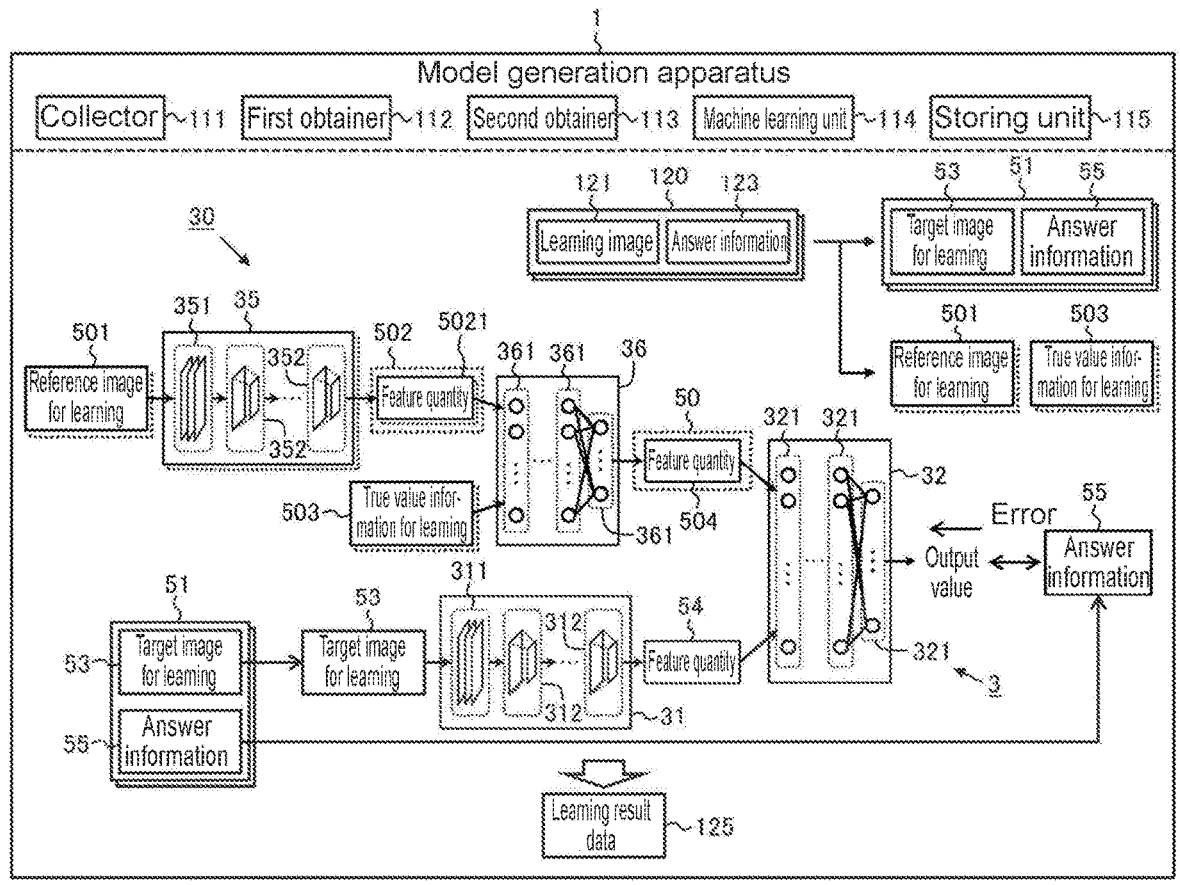
FIG. 4B is a schematic diagram further illustrating a model generation apparatus according to one or more embodiments showing an example software configuration.

FIGS. 4A and 4B are schematic diagrams of the model generation apparatus 1 according to the present embodiment showing its example software configuration. The controller 11 in the model generation apparatus 1 loads the model generation program 81 stored in the storage 12 into the RAM. The CPU in the controller 11 then interprets and executes commands included in the model generation program 81 loaded in the RAM to control each component. The model generation apparatus 1 according to the present embodiment thus operates as a computer including a collector 111, a first obtainer 112, a second obtainer 113, a machine learning unit 114, and a storing unit 115 as software modules as shown in FIGS. 4A and 4B. More specifically, in the present embodiment, each software module in the model generation apparatus 1 is implemented by the controller 11 (CPU).

The collector 111 obtains multiple datasets 120. Each dataset 120 includes a combination of a learning image 121 including the eye(s) of the subject and the answer information 123. The answer information 123 indicates a true value for the gaze direction of the subject included in the corresponding learning image 121. The first obtainer 112 obtains calibration information 50 for learning including feature information 502 for learning and true value information 503 for learning. The feature information 502 for learning is information about the gaze of the eyes of a subject looking in a predetermined direction. The true value information 503 for learning is, for the corresponding feature information 502 for learning, information about the true value for the predetermined direction in which the eyes of the subject are looking. In the present embodiment, the datasets 120 obtained for the subject looking in one or more predetermined directions can be used to obtain the calibration information 50 for learning. The calibration information 50 for learning may include the feature information 502 for learning and the true value information 503 for learning corresponding to each of multiple different predetermined directions. More specifically, multiple predetermined directions may be defined to identify the individual characteristics of the gaze of a person, and the calibration information may include feature information and true value information for each of these predetermined directions.

The second obtainer 113 also obtains multiple learning datasets 51 each including a combination of a target image 53 for learning including the eye(s) of the subject and answer information 55 indicating a true value for the gaze direction of the subject included in the target image 53 for learning. In the present embodiment, each of the above datasets 120 may be used as a learning dataset 51. In other words, the above learning image 121 can be used as the target image 53 for learning, and the above answer information 123 can be used as the answer information 55. The machine learning unit 114 performs machine learning of the estimation model 3 using the obtained multiple learning datasets 51. Performing machine learning includes training, for each learning dataset 51, the estimation model 3 through machine learning to output, in response to an input of the target image 53 for learning and the calibration information 50 for learning, an output value fitting the corresponding answer information 55.

The estimation model 3 may have any structure that can perform a computational operation for estimating the gaze direction of a person using the corresponding calibration information and the corresponding target image and may be determined as appropriate in each embodiment. The calibration information can be in any data format when the calibration information contains elements associated with feature information and true value information (more specifically, elements associated with the features of the eyes defining the gaze in known directions) and may be determined as appropriate in each embodiment. The procedure for machine learning may be determined as appropriate for the structure of the estimation model 3 and the calibration information.

As shown in FIG. 4B, the estimation model 3 includes an extractor 31 and an estimator 32 in the present embodiment. The extractor 31 is an example of a first extractor. In the present embodiment, including the feature information and the true value information refers to including the calibration feature quantity derived from combining the feature information and the true value information. In other words, the calibration information includes the calibration feature quantity. Combining the information may simply refer to integrating pieces of information together, or integrating pieces of information together and then compressing the integrated pieces of information. In the present embodiment, the calibration feature quantity can be obtained by an extractor 35 and a combiner 36. The extractor 35 is an example of a second extractor.

The extractor 31 receives an input of an image (target image) including the eye(s) of a person and outputs an output value corresponding to the feature quantity associated with the input image. In other words, the extractor 31 can extract the feature quantity from the image including the eye(s) of a person. The estimator 32 receives an input of the feature quantity and the calibration feature quantity calculated by the extractor 31 and outputs an output value corresponding to the estimation result of the gaze direction of a person included in the corresponding image (more specifically, the image input into the extractor 31 to obtain the feature quantity). In other words, the estimator 32 estimates the gaze direction of the person based on the feature quantity and the calibration feature quantity of the image. An output from the extractor 31 is connected to an input of the estimator 32.

Similarly to the extractor 31, the extractor 35 receives an input of an image including the eye(s) of a person and outputs an output value corresponding to the feature quantity associated with the input image. The extractor 35 may be the same extractor as the extractor 31 (in other words, the extractor 35 is identical to the extractor 31). The extractor 35 may be an extractor different from the extractor 31 (in other words, the extractor 35 is not identical to the extractor 31). The combiner 36 receives an input of feature information and true value information and outputs an output value corresponding to a calibration feature quantity representing calibration derived from combining the input feature information and the input true value information. In the present embodiment, the feature information includes a feature quantity associated with a reference image including the eye(s) of a person (target person) looking in a predetermined direction. The reference image is provided to the extractor 35, a computational operation of the extractor 35 is performed, and a value corresponding to the feature quantity of the reference image is then output. An output from the extractor 35 is connected to an input of the combiner 36. The feature quantities may be in any data format selected as appropriate in each embodiment.

As shown in FIG. 4A, the machine learning unit 114 first prepares a learning model 4 including an extractor 41 and an estimator 43 to generate trained extractors that can be used as the extractors (31, 35). The extractor 41 corresponds to the extractors (31, 35). An output from the extractor 41 is connected to an input of the estimator 43. The estimator 43 receives an input of the feature quantity calculated by the extractor 41, and outputs an output value corresponding to the estimation result of the gaze direction of a person included in the corresponding image (more specifically, the image input into the extractor 41 to obtain the feature quantity).

The machine learning unit 114 performs machine learning of the learning model 4 using the obtained multiple datasets 120. The machine learning unit 114 inputs the learning image 121 included in each dataset 120 into the extractor 41 and performs a computational operation of the extractor 41 and the estimator 43. Through the computational operation, the machine learning unit 114 obtains, from the estimator 43, an output value corresponding to the estimation result of the gaze direction of the subject included in the learning image 121. In the machine learning of the learning model 4, the machine learning unit 114 trains the learning model 4 to cause, for each dataset 120, an output value obtained from the estimator 43 to fit the answer information 123 through the computational operation. Through the machine learning, the trained extractor 41 can have an output (or the feature quantity) including elements associated with the eyes of the subject included in the learning image 121 to allow the estimator 43 to estimate the gaze direction of the subject.

When the same extractor is used as the extractors (31, 35), the trained extractor 41 generated through machine learning may be used commonly as each of the extractors (31, 35). This structure reduces the volume of information used by each extractor (31, 35), and reduces the cost for machine learning. When different extractors are used as the extractors (31, 35), the machine learning unit 114 prepares a separate learning model 4 for at least the extractor 41 and may perform machine learning separately using each model. The trained extractor 41 generated through each process of machine learning may then be used as the corresponding extractor (31, 35). Each trained extractor 41 may then be used directly as the corresponding extractor (31, 35), or a copy of each trained extractor 41 may be used as the corresponding extractor (31, 35). Similarly, when multiple predetermined directions are defined, extractors 35 may be prepared for the defined different directions, or an extractor 35 may be prepared commonly for the defined different directions. When an extractor 35 is prepared commonly for multiple different directions, the extractor 35 can have a smaller volume of information. This can reduce the cost for machine learning.

As shown in FIG. 4B, the machine learning unit 114 prepares a learning model 30 including an extractor 35, a combiner 36, and an estimation model 3. In the present embodiment, the machine learning unit 114 performs machine learning of the learning model 30 to train the estimator 32 included in the estimation model 3 to finally estimate the gaze direction of a person. During the machine learning of the learning model 30, an output of the combiner 36 is connected to an input of the estimator 32. The estimator 32 and the combiner 36 are thus both trained through the machine learning of the learning model 30.

In this machine learning process, the first obtainer 112 uses the extractor 35 and the combiner 36 to obtain calibration information 50 for learning. More specifically, the first obtainer 112 obtains a reference image 501 for learning including the eye(s) of a subject looking in a predetermined direction and true value information 503 for learning indicating a true value for the predetermined direction. The first obtainer 112 may obtain a learning image 121 included in the dataset 120 obtained for the subject looking in the predetermined direction as the reference image 501 for learning and obtain answer information 123 as the true value information 503 for learning.

The first obtainer 112 inputs the obtained reference image 501 for learning into the extractor 35 and performs a computational operation of the extractor 35. The first obtainer 112 thus obtains, from the extractor 35, an output value corresponding to a feature quantity 5021 associated with the reference image 501 for learning. In the present embodiment, the feature information 502 for learning includes this feature information 5021.

Subsequently, the first obtainer 112 inputs the obtained feature quantity 5021 and the true value information 503 for learning into the combiner 36 and performs a computational operation of the combiner 36. The first obtainer 112 obtains, from the combiner 36, an output value corresponding to a feature quantity 504 associated with calibration derived from combining the feature information 502 for learning and the true value information 503 for learning. The feature quantity 504 is an example of a calibration feature quantity for learning. In the present embodiment, the calibration information 50 for learning includes the feature quantity 504. The first obtainer 112 uses the extractor 35 and the combiner 36 to obtain the calibration information 50 for learning through such computational operations.

When multiple predetermined directions are defined, the first obtainer 112 may obtain a reference image 501 for learning and true value information 503 for learning for each of the different predetermined directions. The first obtainer 112 may input each obtained reference image 501 for learning into the extractor 35 and perform a computational operation of the extractor 35. The first obtainer 112 may obtain each feature quantity 5021 from the extractor 35. Subsequently, the first obtainer 112 may input each obtained feature quantity 5021 and the true value information 503 for learning for each predetermined direction into the combiner 36 and perform a computational operation of the combiner 36. Through such computational operations, the first obtainer 112 may obtain the feature quantity 504 derived from combining the feature information 502 for learning and the true value information 503 for learning for each of the different predetermined directions. In this case, the feature quantity 504 may include information resulting from integrating the feature information 502 for learning and the true value information 503 for learning for each of the different predetermined directions. However, the feature quantity 504 may be obtained with any other method. For example, the feature quantity 504 may be calculated for each different predetermined direction. In this case, each feature quantity 504 may be calculated using the same combiner 36, or the feature quantities 504 for the different predetermined directions may be calculated using different combiners 36.

The second obtainer 113 obtains multiple learning datasets 51 each including a combination of a target image 53 for learning and answer information 55. In the present embodiment, the second obtainer 113 may use at least one of the collected multiple datasets 120 as a learning dataset 51. More specifically, the second obtainer 113 may obtain the learning image 121 included in the dataset 120 as a target image 53 for learning in the learning dataset 51, and may obtain the answer information 123 in the dataset 120 as answer information 55 for the learning dataset 51.

The machine learning unit 114 inputs the target image 53 for learning included in each obtained learning dataset 51 into the extractor 31 and performs a computational operation of the extractor 31. Through this computational operation, the machine learning unit 114 obtains, from the extractor 31, the feature quantity 54 associated with the target image 53 for learning. Subsequently, the machine learning unit 114 inputs the obtained feature quantity 504 (calibration information 50 for learning) obtained from the combiner 36 and the obtained feature quantity 54 into the estimator 32 and performs a computational operation of the estimator 32. Through this computational operation, the machine learning unit 114 obtains, from the estimator 32, an output value corresponding to the estimation result of the gaze direction of the subject included in the target image 53 for learning. In the machine learning of the learning model 30, the machine learning unit 114 trains the learning model 30 to cause, for each learning dataset 51, an output value obtained from the estimator 32 to fit the corresponding answer information 55, while the above feature quantity 504 is being calculated and a computational operation of the above estimation model 3 is being performed.

Training the learning model 30 may include training the extractors (31, 35). In some embodiments, the machine learning of the learning model 4 may train the extractors (31, 35) to extract, from an image, a feature quantity including elements to allow estimation of the gaze direction of a person. Thus, training the extractors (31, 35) may be eliminated from the training process of the learning model 30. Through the machine learning of the learning model 30, the combiner 36 combines the feature information and the true value information and is thus trained to derive a calibration feature quantity useful in estimating the gaze direction of a person. The estimator 32 is also trained to appropriately estimate the gaze direction of a person included in an image using the feature quantity of the image obtained by the extractor 31 and the calibration feature quantity obtained by the combiner 36.

In the machine learning of the learning model 30, the reference image 501 for learning and the true value information 503 for learning used to calculate the feature quantity 504 may be derived from the same subject as for the learning dataset 51 used in the training. When reference images 501 for learning, true value information 503 for learning, and multiple learning datasets 51 are obtained from multiple different subjects, the sources from which these images, information, and datasets are derived may be identifiable to allow use of a reference image 501 for learning, true value information 503 for learning, and multiple learning datasets 51 derived from the same subject in the machine learning of the learning model 30. The sources (in other words, subjects) may be identified with additional information such as identifiers. When reference images 501 for learning, true value information 503 for learning, and multiple learning datasets 51 are obtained from multiple datasets 120, such datasets 120 may further include additional information for identification. In this case, each subject from which an image, information, and datasets are derived can be identified based on additional information. This allows use of the reference image 501 for learning, the true value information 503 for learning, and the multiple learning datasets 51 derived from the same subject in the machine learning of the learning model 30.

The storing unit 115 generates information about the learned learning models 30 (or the learned extractor 31, the learned combiner 36, and the learned estimation model 3) as learning result data 125. The storing unit 115 stores the generated learning result data 125 into a predetermined storage area.

Example Structure of Each Model

The extractors (31, 35, 41), the estimators (32, 43), and the combiner 36 include models having computational parameters that can be learned through machine learning. The machine learning models may be of any type that can perform the corresponding computational operations and may be selected as appropriate in each embodiment. In the present embodiment, the extractors (31, 35, 41) each use a convolutional neural network. The estimators (32, 43) and the combiner 36 each use a fully-coupled neural network.

As shown in FIGS. 4A and 4B, the extractors (31, 35, 41) each include a convolutional layer (311, 351, 411) and a pooling layer (312, 352, 412). The convolutional layer (311, 351, 411) performs a convolutional computation for input data. The convolution computation corresponds to a computational operation to yield a correlation between input data and a predetermined filter. For example, an input image undergoes image convolution that detects a grayscale pattern similar to the grayscale pattern of the filter. The convolutional layer (311, 351, 411) includes neurons corresponding to the convolutional computation. The neurons (nodes) are connected to an output area of either an input layer or a layer preceding (or nearer an input end than) the convolutional layer. The pooling layer (312, 352, 412) performs a pooling process. An input undergoes the pooling process that selectively discards information at positions highly responsive to the filter to achieve invariable response to slight positional changes of features in the data. For example, the pooling layer may extract the greatest value in the filter and delete the other values.

The extractors (31, 35, 41) may each include any number of convolutional layers (311, 351, 411) and any number of pooling layers (312, 352, 412) as appropriate in each embodiment. In the examples of FIGS. 4A and 4B, the convolution layers (311, 351, 411) are nearest the input end (left in the figure). The convolutional layers (311, 351, 411) include an input layer. The pooling layers (312, 352, 412) are nearest an output end (right in the figure). The pooling layers (312, 352, 412) include an output layer. However, the extractors (31, 35, 41) may have any other structure. The convolutional layers (311, 351, 411) and the pooling layers (312, 352, 412) may be in any arrangement determined as appropriate in each embodiment. For example, the convolutional layers (311, 351, 411) and the pooling layers (312, 352, 412) may be arranged alternately. In some embodiments, one or more pooling layers (312, 352, 412) may be arranged after multiple convolutional layers (311, 351, 411) are arranged continuously. The layers included in each extractor (31, 35, 41) may be layers other than convolutional layers and pooling layers. Each extractor (31, 35, 41) may include other layers such as normalized layers, dropout layers, and fully-coupled layers.

Each extractor (31, 35) in the present embodiment has the structure based on the structure of the extractor 41. When the extractors (31, 35) are prepared as separate extractors, the extractors 31 and 35 may have the same structure or may have different structures. Similarly, when multiple predetermined directions are defined and the separate extractors 35 are prepared for the multiple different directions, these extractors 35 prepared for the different directions may have the same structure, or at least some of the extractors 35 may have structures different from the other extractors 35.

The estimators (32, 43) and the combiner 36 each include one or more fully-coupled layers (321, 431, 361). The estimators (32, 43) and the combiner 36 may each include any number of fully-coupled layers (321, 431, 361) as appropriate in each embodiment. For the estimators (32, 43) and the combiner 36 each including multiple fully-coupled layers, the fully-coupled layer nearest the input end is an input layer, and the fully-coupled layer nearest the output end is an output layer. The fully-coupled layers between the input and output layers are intermediate (hidden) layers. For the estimators (32, 43) and the combiner 36 each including a single fully-coupled layer, the fully-coupled layer functions as both an input layer and an output layer.

Each of the fully-coupled layers (321, 431, 361) includes one or more neurons (nodes). Each of the fully-coupled layers (321, 431, 361) may include any number of neurons (nodes) as appropriate in each embodiment. The number of neurons included in the input layer may be determined as appropriate for input data such as the feature quantity and the true value information and their data format. The number of neurons included in the output layer may be determined as appropriate for output data such as the feature quantity and the estimation result and their data format. The neurons included in each fully-coupled layer (321, 431, 361) are coupled to all neurons in the adjacent layers. The neurons may be coupled in a manner other than in this example and may be determined as appropriate in each embodiment.

The convolutional layers (311, 351, 411) and the fully-coupled layers (321, 431, 361) have weights defined for their coupling (coupling weight). Each neuron has a preset threshold. An output of each neuron is basically determined depending on whether the sum of the product of each input and the corresponding weight exceeds the threshold. The threshold may be defined using an activation function. In this case, the sum of the product of each input and the corresponding weight is input into an activation function, which is computed to determine an output of each neuron. The types of the activation function may be selected as appropriate. The coupling weights between the neurons included in the convolutional layers (311, 351, 411) and the fully-coupled layers (321, 431, 361) and the thresholds for the neurons are examples of computational parameters used in computational operations of the extractors (31, 35, 41), the estimators (32, 43), and the combiner 36.

The extractors (31, 35, 41), the estimators (32, 43), and the combiner 36 may input and output in any data format determined as appropriate in each embodiment. For example, the estimators (32, 43) may each include an output layer that directly outputs (e.g., regresses) the estimation results. In some embodiments, the estimators (32, 43) may each include an output layer that includes one or more neurons for each class and outputs the estimation results indirectly, by, for example, outputting, from each neuron, a probability corresponding to the corresponding class. The extractors (31, 35, 41), the estimators (32, 43), and the combiner 36 may each include an input layer that further receives an input of data other than the input data, such as a reference image, a target image, a feature quantity, and true value information. The input data may undergo any preprocessing before being input into the input layer.

In the machine learning of the learning model 4, the machine learning unit 114 repeatedly adjusts, for each dataset 120, the values of the computational parameters used by the extractor 41 and the estimator 43 to reduce the error between an output value obtained from the estimator 43 through the above computational operation and the corresponding answer information 123. This generates the trained extractor 41. In the machine learning of the learning model 30, the machine learning unit 114 repeatedly adjusts, for the reference image 501 for learning, the true value information 503 for learning, and each learning dataset 51, the values of the computational parameters used by the extractors (31, 35), the combiner 36, and the estimator 32 to reduce the error between an output value obtained from the estimator 32 through the above computational operation and the corresponding answer information 55. In the machine learning of this learning model 30, adjusting the values of the computational parameters used by the extractors (31, 35) may be eliminated. This generates each learned learning model 30.

The storing unit 115 generates learning result data 125 for reconstructing the learned estimation model 3 (the extractor 31 and the estimator 32) generated through machine learning, the learned extractor 35, and the learned combiner 36. The learning result data 125 may have any structure that can be used to reconstruct the model and other units. For example, the storing unit 115 generates, as the learning result data 125, information indicating the values of the computational parameters of the generated learned estimation model 3, the learned extractor 35, and the learned combiner 36. The learning result data 125 may further include information indicating the structures of the model and other units. Each structure may be defined using, for example, the number of layers from an input layer to an output layer in a neural network, the types of layers, the number of neurons included in each layer, and the coupling relationship between neurons in adjacent layers. The storing unit 115 stores the generated learning result data 125 into a predetermined storage area.

In the example described below, the results from the machine learning of the extractors (31, 35), the estimator 32, and the combiner 36 are stored as one piece of learning result data 125 for ease of explanation in the present embodiment. However, the learning result data 125 may be stored in any other manner. The results from the machine learning of the extractors (31, 35), the estimator 32, and the combiner 36 may be stored as separate pieces of data.

Gaze Estimation Apparatus

Figure 5A:
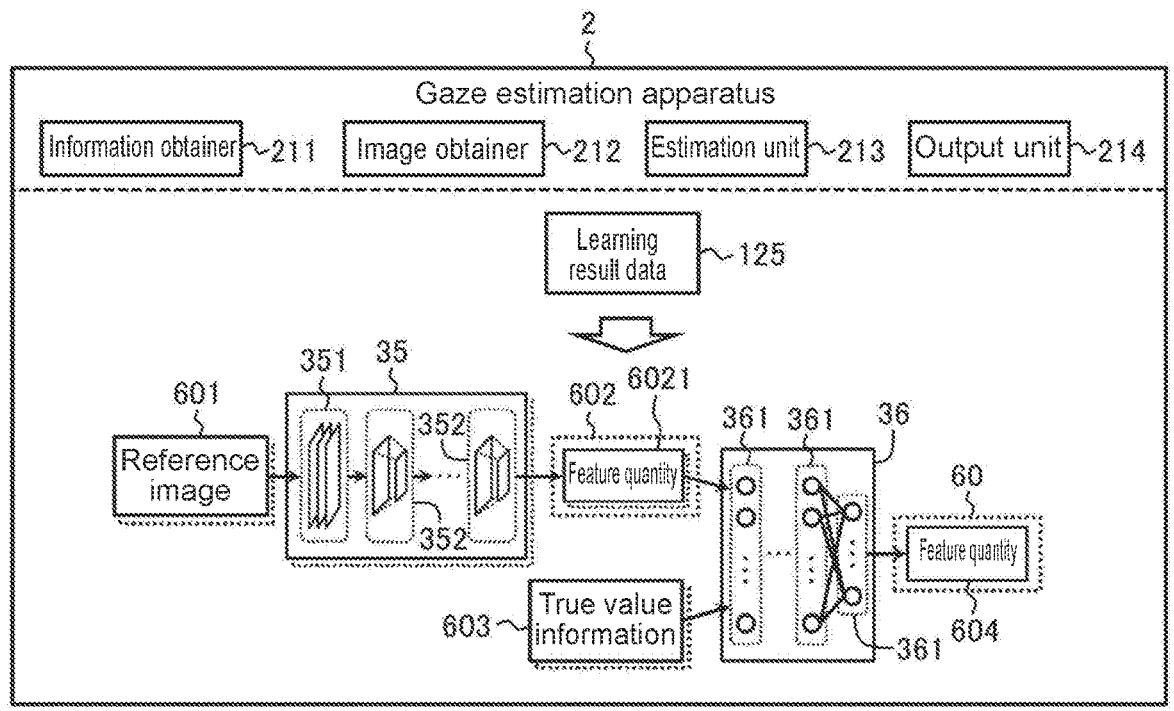
FIG. 5A is a schematic diagram further illustrating a gaze estimation apparatus according to one or more embodiments showing a software configuration.
Figure 5B:
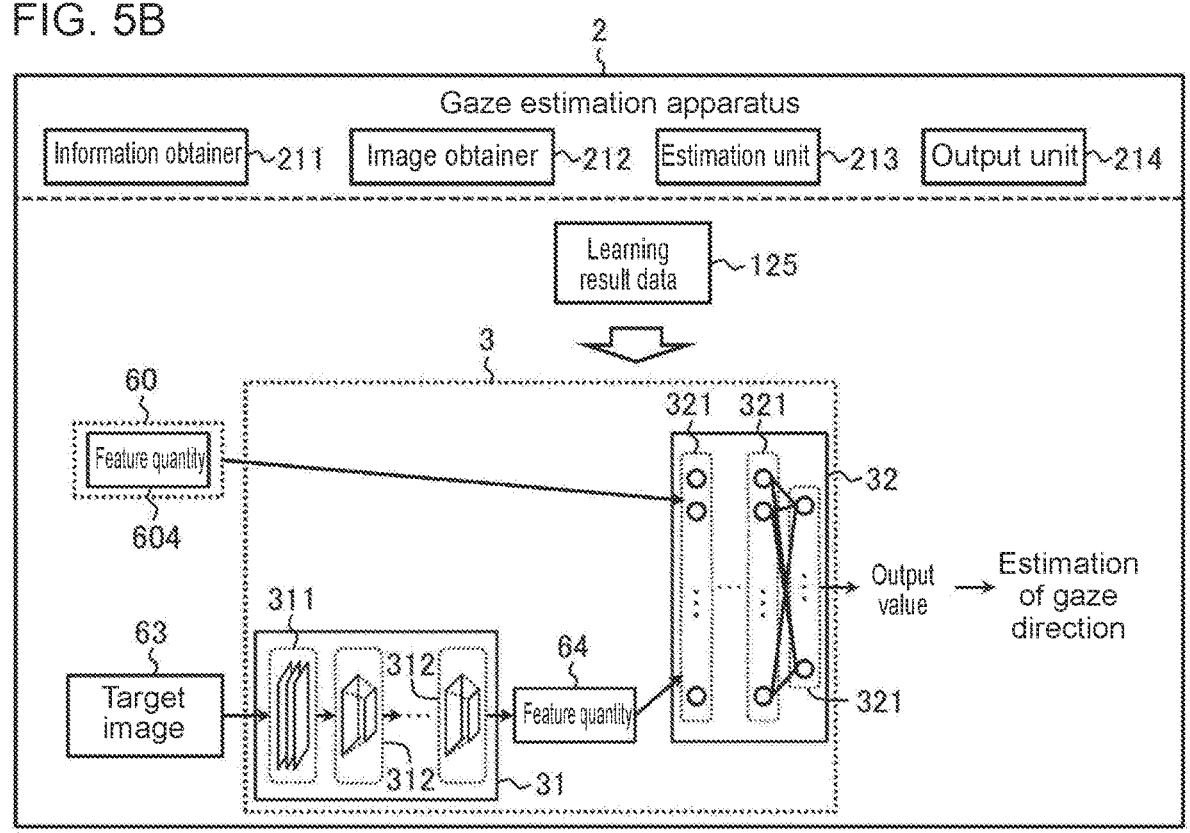
FIG. 5B is a schematic diagram further illustrating a gaze estimation apparatus according to one or more embodiments showing a software configuration.

FIGS. 5A and 5B are schematic diagrams of the gaze estimation apparatus 2 according to the present embodiment showing its software configuration. The controller 21 in the gaze estimation apparatus 2 loads the gaze estimation program 82 stored in the storage 22 into the RAM. The CPU in the controller 21 then interprets and executes commands included in the gaze estimation program 82 loaded in the RAM to control each component. As shown in FIGS. 5A and 5B, the gaze estimation apparatus 2 according to the present embodiment is thus implemented as a computer including an information obtainer 211, an image obtainer 212, an estimation unit 213, and an output unit 214 as software modules. In other words, in the present embodiment, each software module in the gaze estimation apparatus 2 is implemented by the controller 21 (CPU) as in the model generation apparatus 1.

The information obtainer 211 obtains calibration information 60 including feature information 602 about the gaze of the eyes of the target person R looking in a predetermined direction and true value information 603 indicating a true value for the predetermined direction in which the eyes of the target person R are looking. In the present embodiment, as shown in FIG. 5A, the information obtainer 211 holding the learning result data 125 includes the learned extractor 35 and the learned combiner 36. The information obtainer 211 obtains a reference image 601 including the eye(s) of the target person R looking in the predetermined direction. The information obtainer 211 inputs the obtained reference image into the learned extractor 35 and performs a computational operation of the extractor 35. The information obtainer 211 thus obtains, from the extractor 35, an output value corresponding to a feature quantity 6021 associated with the reference image 601. The feature quantity 6021 is an example of a second feature quantity. In the present embodiment, the feature information 602 includes the feature information 6021. The information obtainer 211 also obtains true value information 603. The information obtainer 211 inputs the obtained feature quantity 6021 and the true value information 603 into the learned combiner 36 and performs a computational operation of the combiner 36. The information obtainer 211 obtains, from the combiner 36, an output value corresponding to a feature quantity 604 about calibration derived from combining the feature information 602 and the true value information 603. The feature quantity 604 is an example of a calibration feature quantity. In the present embodiment, the calibration information 60 includes the feature quantity 604. The information obtainer 211 uses the learned extractor 35 and the learned combiner 36 to obtain the calibration information 60 (feature quantity 604) through such computational operations.

The calibration information 60 may include the feature information 602 and the true value information 603 corresponding to each of the different predetermined directions in response to the process for generating the above learned estimation model 3. Similarly to the process for generating the model, the information obtainer 211 may obtain a reference image 601 and true value information 603 for each of the different predetermined directions. The information obtainer 211 inputs each reference image 601 into the learned extractor 35 and performs a computational operation of the extractor 35 to obtain each feature quantity 6021 from the extractor 35. Subsequently, the information obtainer 211 may input each obtained feature quantity 6021 and the true value information 603 for each predetermined direction into the learned combiner 36 and perform a computational operation of the combiner 36. The information obtainer 211 may obtain the feature quantity 604 for calibration from the combiner 36. In this case, the feature quantity 604 may include information resulting from the feature information 602 and the true value information 603 for each of the different predetermined directions. The feature quantity 604 may be obtained with any other method. For example, the feature quantity 604 may be calculated for each different predetermined direction in response to the above process for generating the model. In this case, each feature quantity 604 may be calculated using the same combiner 36, or the feature quantities 604 for the different predetermined directions may be calculated using different combiners 36.

As shown in FIG. 5B, the image obtainer 212 obtains the target image 63 including the eye(s) of the target person R. The estimation unit 213 holding the learning result data 125 includes the learned estimation model 3 generated through machine learning. The estimation unit 213 uses the learned estimation model 3 to estimate the gaze direction of the eyes of the target person R included in the target image 63. In this estimation process, the estimation unit 213 inputs the obtained target image 63 and the calibration information 60 into the learned estimation model 3 and performs a computational operation with the learned estimation model 3. In this manner, the estimation unit 213 obtains, from the learned estimation model 3, an output value corresponding to the estimation result of the gaze direction of the eyes of the target person R included in the target image 63.

The computational operation with the learned estimation model 3 may be selected as appropriate for the structure of the learned machine learning model 3. The learned estimation model 3 includes the learned extractor 31 and the learned estimator 32 in the present embodiment. The estimation unit 213 first inputs the obtained target image 63 into the learned extractor 31 and performs a computational operation of the extractor 31. Through this computational operation, the estimation unit 213 obtains, from the extractor 31, an output value corresponding to the feature quantity 64 associated with the target image 63. The feature quantity 64 is an example of a first feature quantity. The feature quantity 6021 and the feature quantity 64 may be each replaceable by an image feature quantity. Subsequently, the estimation unit 213 inputs the feature quantity 604 obtained from the information obtainer 211 and the feature quantity 64 obtained from the extractor 31 into the estimator 32 and performs a computational operation of the estimator 32. In the present embodiment, performing the computational operation with the learned estimation model 3 includes performing the computational operations of the extractor 31 and the estimator 32. Through such computational operations, the estimation unit 213 obtains, from the estimator 32, an output value corresponding to the estimation result of the gaze direction of the eyes of the target person R included in the target image 63. The output unit 214 then outputs information about the estimation result of the gaze direction of the target person R.

Others

Each software module in the model generation apparatus 1 and the gaze estimation apparatus 2 will be described in detail in the operation examples below. In the present embodiment, each software module in the model generation apparatus 1 and the gaze estimation apparatus 2 is implemented by a general-purpose CPU. However, some or all of the software modules may be implemented by one or more dedicated processors. In other words, each of the modules may be implemented as a hardware module. For the software configurations of the model generation apparatus 1 and the gaze estimation apparatus 2, software modules may be eliminated, substituted, or added as appropriate in each embodiment.

3. Operation Examples

Model Generation Apparatus

Figure 6:
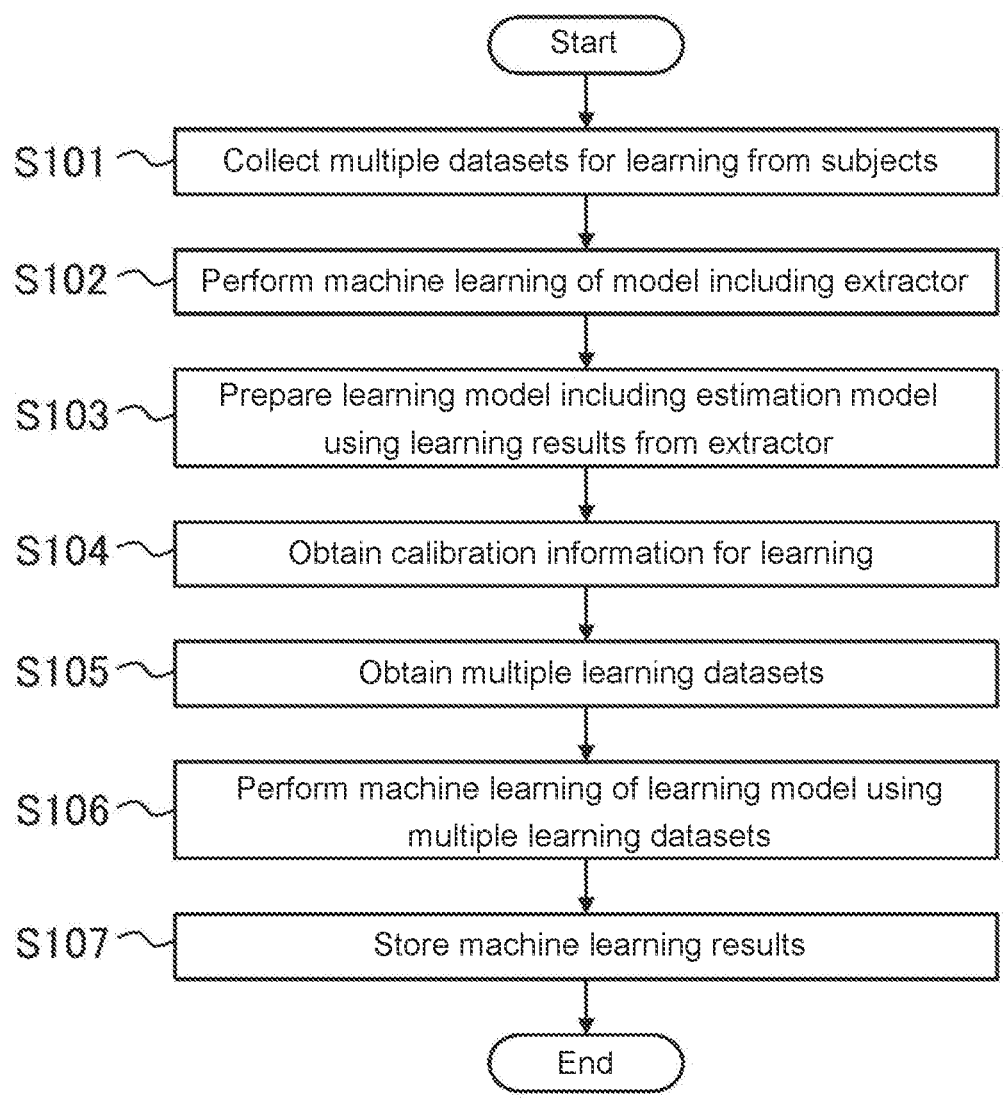
FIG. 6 is a flowchart illustrating an example procedure performed by a model generation apparatus according to one or more embodiments.

FIG. 6 is a flowchart of an example procedure performed by the model generation apparatus 1 according to the present embodiment. The procedure described below is an example of a model generation method. The procedure described below is a mere example, and each of its steps may be modified in any possible manner. In the procedure described below, steps may be eliminated, substituted, or added as appropriate in each embodiment.

Step S101

In step S101, the controller 11 operates as the collector 111 to obtain multiple datasets 120 for learning from subjects. Each dataset 120 includes a combination of a learning image 121 including the eye(s) of a subject and answer information 123 indicating a true value for the gaze direction of the subject included in the learning image 121.

Each dataset 120 may be generated as appropriate. For example, the camera S or a camera of the same type as the camera S and a subject are prepared. The number of subjects may be determined as appropriate. A subject is instructed to look in various directions. The face of the subject looking in a specified direction is then photographed with the camera. In this manner, learning images 121 are obtained. The learning images 121 may be the images directly obtained with the camera, or may be images generated through image processing on the images obtained with the camera. Each obtained learning image 121 is associated with answer information 123 indicating a true value for the gaze direction specified for the subject. When multiple subjects are used, each obtained learning image 121 is further associated with additional information such as an identifier of a subject to identify the source of the dataset 120. Each dataset 120 can be generated through this process. The learning image 121 and the answer information 123 may be obtained with a method similar to the method for obtaining the reference image 601 and the true value information 603 (FIG. 8) described below.

Each dataset 120 may be automatically generated through the operation of a computer or at least partially manually generated through an operation performed by an operator. Each dataset 120 may be generated by the model generation apparatus 1 or by a computer other than the model generation apparatus 1. When the model generation apparatus 1 generates each dataset 120, the controller 11 may perform the series of processing steps described above automatically or in response to a manual operation performed by an operator with the input device 15 to obtain multiple datasets 120. When another computer generates each dataset 120, the controller 11 may obtain multiple datasets 120 generated by the other computer through, for example, a network or the storage medium 91. Some of the datasets 120 may be generated by the model generation apparatus 1, and the remaining other datasets 120 may be generated by one or more other computers.

Any number of datasets 120 may be obtained. The number of datasets 120 may be selected as appropriate in each embodiment. After obtaining the multiple datasets 120, the controller 11 advances the processing to subsequent step S102.

Step S102

In step S102, the controller 11 operates as the machine learning unit 114 to perform machine learning of the learning model 4 using the collected multiple datasets 120. In this machine learning process, the controller 11 trains the extractor 41 and the estimator 43 to cause, for each dataset 120, an output value (an estimation result of the gaze direction) to fit the corresponding answer information 123 from the estimator 43 in response to an input of the learning image 121 into the extractor 41. All the collected datasets 120 may not be used in the machine learning of the learning model 4. The datasets 120 used in the machine learning of the learning model 4 may be selected as appropriate.

In an example, the controller 11 first prepares neural networks for the extractor 41 and the estimator 43 that are to be trained through machine learning. The architecture of each neural network (e.g., the number of layers, the types of layers, the number of neurons in each layer, the coupling relationship between neurons in adjacent layers) to be prepared, the default values of the coupling weights between neurons, and the default threshold of each neuron may be preset using a template or may be input by an operator. For relearning, the controller 11 may prepare the extractor 41 and the estimator 43 based on learning result data previously obtained through past machine learning.

The controller 11 performs the process for training the extractor 41 and the estimator 43 using the learning image 121 included in each dataset 120 as training data (input data) and the answer information 123 as supervisory data (supervisory signal or label). The training process may include stochastic gradient descent and mini-batch gradient descent.

The controller 11 first inputs the learning image 121 into the extractor 41 and performs a computational operation of the extractor 41. More specifically, the controller 11 inputs a learning image 121 into the input layer of the extractor 41 (the convolutional layer 411 nearest the input end in the example of FIG. 4A), and performs a forward propagation computational operation of each layer (411, 412), or for example, determines neuronal firing in each layer sequentially from the layer on the input end. Through this computational operation, the controller 11 obtains an output value corresponding to the feature quantity extracted from the learning image 121 from the output layer of the extractor 41 (the pooling layer 412 nearest the output end in the example of FIG. 4A).

Subsequently, the controller 11 inputs the obtained output value (feature quantity) into the input layer of the estimator 43 (fully-coupled layer 431 nearest the input end) in the same manner as in the computational operation of the extractor 41, and performs a forward propagation operation of the estimator 43. Through this computational operation, the controller 11 obtains, from the output layer of the estimator 43 (fully-coupled layer 431 nearest the output end), an output value corresponding to the estimation result of the gaze direction of the subject included in the learning image 121.

The controller 11 then calculates the error between the output value obtained from the output layer of the estimator 43 and the answer information 123. A loss function may be used to calculate the error (loss). The loss function is used to evaluate a difference (or a degree of difference) between an output from a machine learning model and its answer. An error calculated using the loss function is greater as the difference between the output value obtained from the output layer and the answer is greater. The loss function used for calculating such an error may be of any type selected as appropriate in each embodiment.

The controller 11 uses the error back propagation method to calculate an error in the value of each computational parameter (the coupling weight between neurons and the threshold of each neuron) for the extractor 41 and the estimator 43 using the gradient of the error in the calculated output value from the layer nearest the output end. The controller 11 updates the value of each computational parameter of the extractor 41 and the estimator 43 based on the calculated error. The values of the computational parameters may be updated by the frequency adjusted based on the learning rate. The learning rate may be provided with an indication by an operator or provided as a value preset in a program.

The controller 11 adjusts, for each dataset 120, the value of each computational parameter used by the extractor 41 and the estimator 43 through the above series of updating processing steps to reduce the sum of the calculated errors. For example, until the predetermined condition is satisfied, such as an operation being performed a predetermined number of times or the sum of calculated errors falling below a threshold, the controller 11 may repeatedly adjust the value of each computational parameter used by the extractor 41 and the estimator 43 with the above series of processing steps.

Through the machine learning, the controller 11 can generate, for each dataset 120, the trained learning model 4 trained to appropriately estimate the gaze direction of the subject included in the learning image 121. The trained extractor 41 can have an output (more specifically, the feature quantity) including elements associated with the eyes of the subject included in the learning image 121 to allow the estimator 43 to estimate the gaze direction of the subject. Upon completion of the machine learning of the learning model 4, the controller 11 advances the processing to subsequent step S103.

Step S103

In step S103, the controller 11 prepares the learning model 30 including the estimation model 3 using the learning results from the extractor 41.

In the present embodiment, the controller 11 prepares the extractors (31, 35) based on the learning results from the extractor 41. More specifically, the controller 11 uses the trained extractor 41 generated in step S102 or its copy as each extractor (31, 35). When the extractors (31, 35) are prepared as separate extractors, or when multiple predetermined directions are defined and separate extractors 35 are prepared for the different predetermined directions, the controller 11 may prepare separate learning models 4 and perform machine learning of these learning models 4 in step S102. The controller 11 may then use the trained extractor 41 generated through machine learning or its copy as each extractor (31, 35).

The controller 11 also prepares neural networks for the estimator 32 and the combiner 36. Similarly to the above extractor 41 and the other, the configurations of the neural networks for the estimator 32 and the combiner 36, the default values of the coupling weights between the neurons, and the default threshold of each neuron may be provided in the form of a template or may be input by an operator. For relearning, the controller 11 may prepare the estimator 32 and the combiner 36 based on learning result data previously obtained through past machine learning. After preparing the learning model 30 including the extractors (31, 35), the estimator 32, and the combiner 36, the controller 11 advances the processing to subsequent step S104.

Step S104

In step S104, the controller 11 operates as the first obtainer 112 to obtain calibration information 50 for learning including feature information 502 for learning and true value information 503 for learning.

In the present embodiment, the controller 11 uses the extractor 35 and the combiner 36 to obtain the calibration information 50 for learning. More specifically, the controller 11 first obtains a reference image 501 for learning including the eye(s) of the subject looking in a predetermined direction and true value information 503 for learning indicating a true value for the predetermined direction (gaze direction) in which the subject included in the reference image 501 for learning is looking. The controller 11 may obtain the learning image 121 included in the dataset 120 obtained for the subject looking in the predetermined direction as the reference image 501 for learning, and may obtain the answer information 123 as the true value information 503 for learning. In some embodiments, the controller 11 may obtain the reference image 501 for learning and the true value information 503 for learning separately from the dataset 120. The reference image 501 for learning and the true value information 503 for learning may be obtained in the same manner as for generating the dataset 120.

The controller 11 inputs the obtained reference image 501 for learning into the input layer of the extractor 35 (the convolutional layer 351 nearest the input end in the example of FIG. 4B), and performs a forward propagation computational operation of the extractor 35. Through this computational operation, the controller 11 obtains an output value corresponding to the feature quantity 5021 (feature information 502 for learning) associated with the reference image 501 for learning from the output layer of the extractor 35 (the pooling layer 352 nearest the output end in the example of FIG. 4B). Subsequently, the controller 11 inputs the obtained feature quantity 5021 and the true value information 503 for learning into the input layer of the combiner 36 (fully-coupled layer 361 nearest the input end), and performs a forward propagation computational operation of the combiner 36. Through this computational operation, the controller 11 obtains, from the output layer of the combiner 36 (fully-coupled layer 361 nearest the output end), an output value corresponding to the feature quantity 504 associated with calibration.

In the present embodiment, the controller 11 uses the extractor 35 and the combiner 36 to obtain the calibration information 50 for learning including the feature quantity 504 through such computational operations. When multiple predetermined directions are defined, the controller 11 may obtain a reference image 501 for learning and true value information 503 for learning for each of the different predetermined directions. The controller 11 may then obtain the calibration information 50 for learning including the feature information 502 for learning and the true value information 503 for learning for each of the different predetermined directions through the computational operations of the extractor 35 and the combiner 36. After obtaining the calibration information 50 for learning, the controller 11 advances the processing to subsequent step S105.

Step S105

In step S105, the controller 11 operates as the second obtainer 113 to obtain multiple learning datasets 51 each including a combination of a target image 53 for learning and answer information 55.

In the present embodiment, the controller 11 may use at least one of the collected multiple datasets 120 as the learning dataset 51. More specifically, the controller 11 may obtain a learning image 121 in the dataset 120 as a target image 53 for learning in the learning dataset 51, and may obtain answer information 123 in the dataset 120 as answer information 55 for the learning dataset 51. In some embodiments, the controller 11 may obtain each learning dataset 51 separately from the dataset 120. Each learning dataset 51 may be obtained in the same manner as for generating the dataset 120.

Any number of learning datasets 51 may be obtained. The number of datasets 51 may be selected as appropriate in each embodiment. After obtaining multiple learning datasets 51, the controller 11 advances the processing to subsequent step S106. The processing in step S105 may be performed at a time not limited to the above example. The processing in step S105 may be performed at a selected time before the processing in step S106 (described later) is performed.

Step S106

In step S106, the controller 11 operates as the machine learning unit 114 to perform machine learning of the estimation model 3 using the obtained multiple learning datasets 51. The estimation model 3 is trained through machine learning to output, in response to an input of a target image 53 for learning and calibration information 50 for learning, an output value fitting the corresponding answer information 55 for each learning dataset 51.

In the present embodiment, the controller 11 uses the target image 53 for learning, the reference image 501 for learning, and the true value information 503 for learning in each learning dataset 51 as training data, and the answer information 55 in each learning dataset 51 as supervisory data to perform the training process of the learning model 30 including the estimation model 3. The training process may include stochastic gradient descent and mini-batch gradient descent.

For example, the controller 11 inputs the target image 53 for learning included in each learning dataset 51 into the input layer of the extractor 31 (the convolutional layer 311 nearest the input end in the example of FIG. 4B), and performs a forward propagation computational operation of the extractor 31. Through this computational operation, the controller 11 obtains an output value corresponding to the feature quantity 54 extracted from the target image 53 for learning from the output layer of the extractor 31 (the pooling layer 312 nearest the output end in the example of FIG. 4B).

Subsequently, the controller 11 inputs the feature quantity 504 obtained from the combiner 36 and the feature quantity 54 obtained from the extractor 31 into the input layer of the estimator 32 (fully-coupled layer 431 nearest the input end), and performs a forward propagation operation of the estimator 32. Through this computational operation, the controller 11 obtains, from the output layer of the estimator 32 (fully-coupled layer 321 nearest the output end), an output value corresponding to the estimation result of the gaze direction of the subject included in the target image 53 for learning.

The controller 11 then calculates the error between the output value obtained from the output layer of the estimator 32 and the corresponding answer information 55. Similarly for the machine learning of the learning model 4, any loss function may be used to calculate the error. The controller 11 uses the error back propagation method to calculate an error in the value of each computational parameter of the extractors (31, 35), the combiner 36, and the estimator 32 using the gradient of the error in the calculated output value from the layer nearest the output end. The controller 11 updates the value of each computational parameter of the extractors (31, 35), the combiner 36, and the estimator 32 based on the calculated error. Similarly for the machine learning of the learning model 4, the value of each computational parameter may be updated by the frequency adjusted based on the learning rate.

The controller 11 performs the above series of updating processing steps while calculating the feature quantity 504 in step S104 and performing the computational operation with the estimation model 3. The controller 11 thus adjusts the values of the computational parameters used by the extractors (31, 35), the combiner 36, and the estimator 32 to reduce the sum of errors in the calculated output values for the reference image 501 for learning, the true value information 503 for learning, and each learning dataset 51. Similarly for the machine learning of the learning model 4, the controller 11 may repeatedly adjust the value of each computational parameter used by the extractors (31, 35), the combiner 36, and the estimator 32 with the above series of updating processing steps until the predetermined condition is satisfied.

As described above, the subjects as the sources of reference images 501 for learning, true value information 503 for learning, and multiple learning datasets 51 may be identified to allow use of the reference image 501 for learning, the true value information 503 for learning, and the multiple learning datasets 51 derived from the same subject in the machine learning of the learning model 30. The extractors (31, 35) are trained to extract the feature quantity from an image containing elements to allow estimation of the gaze direction of a person through machine learning of the above learning model 4. Thus, the process for adjusting the value of each computational parameter used by the extractors (31, 35) may be eliminated from the above updating process. The processing in step S104 may be performed at a selected time before the computational operation of the estimator 32 is performed. For example, the processing in step S104 above may be performed after the computational operation of the extractor 31 is performed.

Through the machine learning, the controller 11 can generate, for each learning dataset 51, the trained learning model 30 trained to appropriately estimate the gaze direction of a person using a reference image 501 for learning, true value information 503 for learning, and a target image 53 for learning. More specifically, the controller 11 can generate, for each learning dataset 51, the trained combiner 36 trained to derive a calibration feature quantity useful in estimating the gaze direction of a person. The controller 11 can generate, for each learning dataset 51, the learned estimator 32 trained to appropriately estimate the gaze direction of a person included in the corresponding image using the feature quantity of the image obtained by the extractor 31 and the calibration feature quantity obtained by the combiner 36. Upon completion of the machine learning of the learning model 30, the controller 11 advances the processing to subsequent step S107.

Step S107

In step S107, the controller 11 operates as the storing unit 115 to generate information about the trained learning model 30 (the estimation model 3, the extractor 35, and the combiner 36) through machine learning as the learning result data 125. The controller 11 stores the generated learning result data 125 into a predetermined storage area.

The predetermined storage area may be, for example, the RAM in the controller 11, the storage 12, an external storage, a storage medium, or a combination of these. The storage medium is, for example, a CD or a DVD. The controller 11 may store the learning result data 125 into the storage medium through the drive 17. The external storage may be, for example, a data server, such as a network attached storage (NAS). In this case, the controller 11 may use the communication interface 13 to store the learning result data 125 into the data server through a network. The external storage may be connected to the model generation apparatus 1 through the external interface 14.

Upon completion of storing the learning result data 125, the controller 11 ends the procedure of the present operation example.

The generated learning result data 125 may be provided to the gaze estimation apparatus 2 at an appropriate time. For example, the controller 11 may transfer the learning result data 125 to the gaze estimation apparatus 2 in step S107 or in a step separate from step S107. The gaze estimation apparatus 2 may receive the transferred data to obtain the learning result data 125. In another example, the gaze estimation apparatus 2 may use the communication interface 23 to access the model generation apparatus 1 or a data server through a network and obtain the learning result data 125. In still another example, the gaze estimation apparatus 2 may obtain the learning result data 125 through the storage medium 92. For example, the gaze estimation apparatus 2 may prestore the learning result data 125.

Further, the controller 11 may update or newly generate the learning result data 125 by regularly or irregularly repeating the processing in steps S101 to S107 (or steps S104 to S107) above. During the repeated processes, at least part of data used for machine learning may undergo changes, modifications, additions, and deletions as appropriate. The controller 11 may provide the updated or newly generated learning result data 125 to the gaze estimation apparatus 2 in any manner to update the learning result data 125 stored in the gaze estimation apparatus 2.

Gaze Estimation Apparatus

Figure 7:
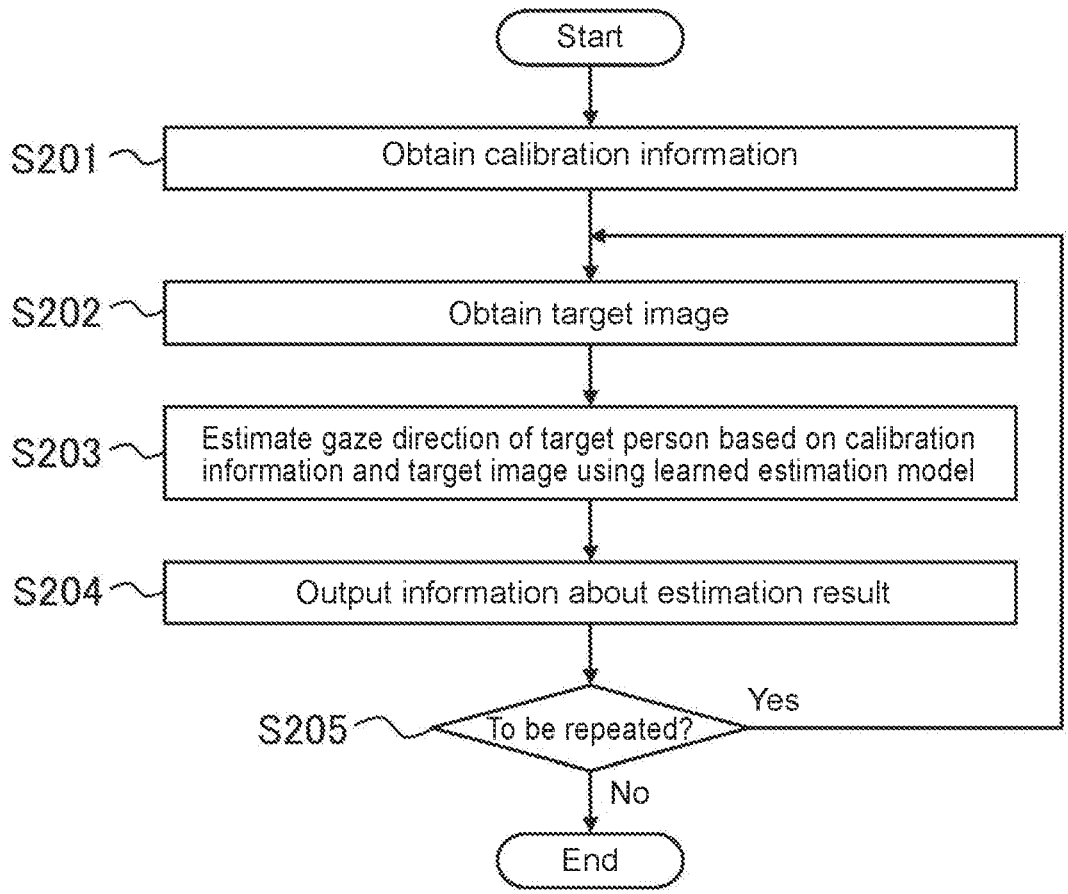
FIG. 7 is a flowchart illustrating an example procedure performed by a gaze estimation apparatus according to one or more embodiments.

FIG. 7 is a flowchart showing the procedure performed by the gaze estimation apparatus 2 according to the present embodiment. The procedure described below is an example of a gaze estimation method. The procedure described below is a mere example, and each of its steps may be modified in any possible manner. In the procedure described below, steps may be eliminated, substituted, or added as appropriate in each embodiment.

Step S201

In step S201, the controller 21 operates as the information obtainer 211 to obtain calibration information 60 including feature information 602 and true value information 603.

Figure 8:
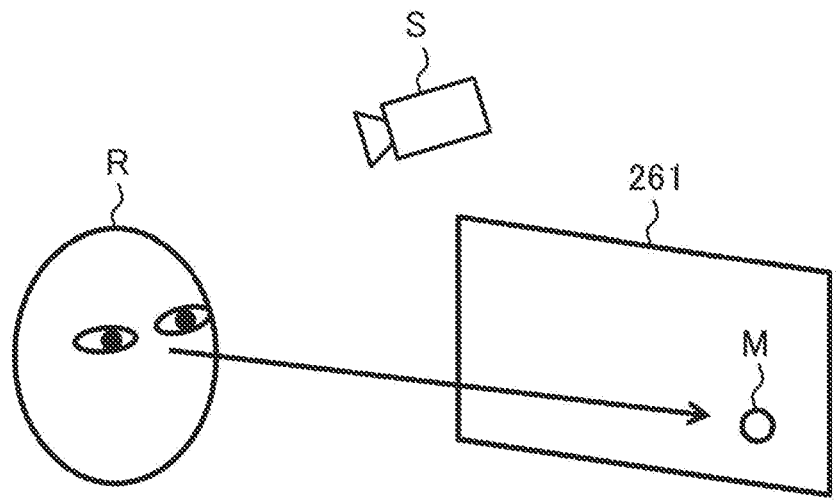
FIG. 8 is a schematic diagram illustrating a process for obtaining calibration information in one situation in an embodiment or embodiments.

FIG. 8 is a schematic diagram of a method for obtaining the calibration information 60. In the present embodiment, the controller 21 first outputs an instruction to the target person R to look in a predetermined direction. In the example of FIG. 8, the output device 26 includes a display 261. The controller 21 displays a marker M on the display 261 at a position corresponding to the predetermined direction. The controller 21 then outputs an instruction to the target person R to look at the marker M displayed on the display 261. The instruction may be output in any format selected as appropriate in each embodiment. When the output device 26 includes a speaker, an instruction may be output by voice through the speaker. When the output device 26 includes a display device such as the display 261, an instruction may be output as an image display on the display device. After outputting the instruction, the controller 21 photographs the face of the target person R looking at the marker M with the camera S. The camera S is an example of a sensor that can measure the gaze of the target person R. The controller 21 obtains a reference image 601 including the eye(s) of the target person looking in the predetermined direction. The controller 21 can also obtain true value information 603 in accordance with its output instruction.

An indicator for the predetermined direction may be other than the marker M on the display 261, and may be selected as appropriate in each embodiment. In the scene for estimating the gaze direction of the driver, for example, once the installment position of the camera S is determined, the positional relationship is defined between the camera S and an installed object such as a rearview mirror. When an object is positioned with respect to the sensor for measuring the gaze of the target person R, the controller 21 may output an instruction to look at the object. When an object is positioned with respect to the sensor for measuring the gaze of the target person R, the controller 21 may output an instruction to the target person R to look at the object. This method can appropriately and easily obtain the reference image 601 reflecting the characteristics of the gaze of the target person R and the corresponding true value information 603. The predetermined direction may not be completely the same between the above scene for generating the model and the real scene (scene in operation) for estimating the gaze direction. To respond to this, multiple different predetermined directions may be defined. In an operating scene, data in at least one of the predetermined directions (the reference image 601 and the true value information 603 in the present embodiment) may be randomly selected in the scene in operation.

The controller 21 then refers to the learning result data 125 to define the learned extractor 35 and the learned combiner 36. The controller 21 inputs the obtained reference image 601 into the input layer of the learned extractor 35 and performs a forward propagation computational operation of the extractor 35. Through this computational operation, the controller 21 obtains, from the output layer of the combiner 35 that has learned an output value corresponding to the feature quantity 6021 (feature information 602) associated with the reference image 601. Subsequently, the controller 21 inputs the obtained feature quantity 6021 and the true value information 603 into the input layer of the learned combiner 36 and performs a forward propagation computational operation of the combiner 36. Through this computational operation, the controller 21 obtains, from the output layer of the combiner 36 that has learned an output value corresponding to the feature quantity 604 associated with calibration. In the present embodiment, the controller 21 uses the extractor 35 and the combiner 36 to obtain the calibration information 60 including the feature quantity 604 through such computational operations.

As described above, the calibration information 60 may include the feature information 602 and the true value information 603 corresponding to each of the different predetermined directions in response to the process for generating the learned estimation model 3. In the present embodiment, the controller 21 may obtain the reference image 601 and the true value information 603 for each of the different predetermined directions by performing the above obtaining process (FIG. 8) for each predetermined direction. The controller 21 may then obtain the calibration information 60 (feature quantity 604) including the feature information 602 and the true value information 603 for each of the different predetermined directions through the computational operations of the learned extractor 35 and the learned combiner 36. After obtaining the calibration information 60, the controller 21 advances the processing to subsequent step S202.

Step S202

In step S202, the controller 21 operates as the image obtainer 212 to obtain a target image 63 including the eye(s) of the target person R. In the present embodiment, the controller 21 controls the operation of the camera S to photograph the target person R through the external interface 24. The controller 21 can thus directly obtain the target image 63 from the camera S to undergo the process for estimating the gaze direction. The target image 63 may be a moving image or a still image. However, the paths on which the target image 63 is obtained are not limited to the above examples. For example, the camera S may be controlled by another computer. In this case, the controller 21 may indirectly obtain the target image 63 from the camera S with another computer. After obtaining the target image 63, the controller 21 advances the processing to subsequent step S203.

Step S203

In step S203, the controller 21 operates as the estimation unit 213 to estimate the gaze direction of the target person R included in the obtained target image 63 using the learned estimation model 3. The controller 21 then inputs the obtained target image 63 and calibration information 60 into the learned estimation model 3 and performs a computational operation with the learned estimation model 3. In this manner, the controller 21 obtains, from the learned estimation model 3, an output value corresponding to the estimation result of the gaze direction of the target person R included in the target image 63.

More specifically, the controller 21 refers to the learning result data 125 and defines the learned extractor 31 and the learned estimator 32. The controller 21 inputs the obtained target image 63 into the input layer of the learned extractor 31 and performs a forward propagation computational operation of the extractor 31. Through this computational operation, the controller 21 obtains, from the output layer of the learned extractor 31, an output value corresponding to the feature quantity 64 associated with the target image 63. Subsequently, the controller 21 inputs the feature quantity 604 obtained in step S201 and the feature quantity 64 obtained from the extractor 31 into the input layer of the learned estimator 32 and performs a forward propagation computational operation process of the estimator 32. Through this computational operation, the controller 21 obtains, from the output layer of the learned estimator 32, an output value corresponding to the estimation result of the gaze direction of the target person R included in the target image 63. In the present embodiment, estimating the gaze direction of the target person R included in the target image 63 is achieved by inputting the target image 63 and the calibration information 60 into the learned estimation model 3 and performing a forward propagation computational operation with the learned estimation model 3. The processing in step S201 may be performed at a selected time before the computational operation of the estimator 32 is performed. For example, the processing in step S201 above may be performed after the computational operation of the learned extractor 31 is performed. Upon completion of the gaze direction estimation process, the controller 21 advances the processing to subsequent step S204.

Step S204

In step S204, the controller 21 operates as the output unit 214 to output information about the estimation result of the gaze direction of the target person R.

The destination and the details of the output information may be determined as appropriate in each embodiment. For example, the controller 21 may output the estimation results of the gaze direction directly to a memory such as the RAM or the storage 22, or the output device 26. The controller 21 may create a history of the gaze direction of the target person R by outputting the estimation results of the gaze direction to a memory.

For example, the controller 21 may perform information processing based on the estimation result of the gaze direction. The controller 21 may then output the processed information as information about the estimation result. In an example situation described below, the gaze direction of the driver is estimated to monitor the state of the driver driving a vehicle. In this situation, the controller 21 may determine whether the driver is looking away based on the estimated gaze direction. When the driver is determined to be looking away, the controller 21 may perform an output process in step S204 including instructing the driver to look in the direction appropriate for driving or decelerating the traveling speed of the vehicle. In another example situation, the gaze direction of the target person R is estimated through a user interface. In this situation, the controller 21 may perform, as the output process in step S204, an application corresponding to an icon appearing in the estimated gaze direction or may change the display range to cause a display object in the estimated gaze direction to appear at the center of the display. After outputting information about the estimation result of the gaze direction, the controller 21 advances the processing to subsequent step S205.

Step S205

In step S205, the determination is performed as to whether the process for estimating the gaze direction is to be repeated. A criterion for determining whether the estimation process is to be repeated may be defined as appropriate in each embodiment.

For example, the number of times may be set as the determination criterion for the process to be repeated. In this case, the controller 21 may determine whether the estimation process for the gaze direction is to be repeated based on whether the period or the count of the process for estimating the gaze direction has reached a specified value. More specifically, when the period or the count of the estimation process has not reached the specified value, the controller 21 may determine that the estimation process for the gaze direction is to be repeated. When the period or the count of the estimation process has reached the specified value, the controller 21 determines that the process for the gaze direction is not to be repeated.

For example, the controller 21 may repeat the process for estimating the gaze direction until an instruction to end the process is provided through the input device 25. In this case, the controller 21 may determine that the estimation process for the gaze direction is to be repeated while no instruction to end the process is being provided. The controller 21 may then determine that the estimation process for the gaze direction is not to be repeated once an instruction to end the process is provided.

When determining that the estimation process for the gaze direction is to be repeated, the controller 21 returns the processing to step S202 and repeatedly performs the process for obtaining the target image 63 (step S202) and the process for estimating the gaze direction of the target person R (step S203). This allows continuous estimation of the gaze direction of the target person R. When determining that the estimation process for the gaze direction is not to be repeated, the controller 21 stops repeating the estimation process for the gaze direction and ends the procedure associated with this operation example.

Once the calibration information 60 (feature quantity 604) is derived in step S201, the calibration information 60 can be reused in each cycle of the estimation process for the gaze direction unless the calibration information 60 is not to be updated. As in the present embodiment, the processing in step S201 may be eliminated in each cycle of the estimation process for the gaze direction. The processing in step S201 may not be eliminated in all the cycles of the estimation process for the gaze direction. To update the calibration information 60, the processing in step S201 may be performed again at a selected time. The processing in step S204 may be eliminated in at least some cycles of the estimation process.

Features

In the present embodiment as described above, the gaze direction of the target person R is estimated using the calibration information 60 including the feature information 602 and the true value information 603, in addition to the target image 63 including the eye(s) of the target person R in step S203. The feature information 602 and the true value information 603 are used to identify the characteristics of the gaze of the target person R in known directions using true values. Thus, the structure according to the present embodiment can estimate the gaze direction of the target person R included in the target image 63 reflecting individual differences between the subject and the target person R that can be identified from the calibration information 60. Thus, the gaze direction of the target person R can be estimated with higher accuracy in step S203. For the target person R with the eyes not being directed in the gaze direction due to, for example, strabismus, the accuracy of estimating the gaze direction is also expected to increase using the calibration information 60. In the present embodiment, the calibration information 60 may include feature information 602 and true value information 603 corresponding to each of multiple different predetermined directions. This allows the characteristics of the gaze of the target person R in the different predetermined directions to be identified more accurately based on the calibration information 60. This structure allows estimation of the gaze direction of the target person R with still higher accuracy. The model generation apparatus 1 according to the present embodiment can generate the learned estimation model 3 that allows estimation of the gaze direction of the target person R with such high accuracy through the processing in steps S101 to S107.

In the present embodiment, the reference image 601 and the true value information 603 are not used directly as the calibration information 60, but the feature quantity 604 derived by extracting the feature quantity 6021 from the reference image 601 and combining the obtained feature information 602 and the true value information 603 is used as the calibration information 60. This reduces the volume of information used by the calibration information 60. In the present embodiment, the feature quantity 604 is derived through the processing in step S201. When the process for estimating the gaze direction of the target person R is to be repeated, the derived feature quantity 604 can be reused in each cycle. This can reduce the processing cost for the processing in step S203. Thus, the structure according to the present embodiment increases the speed of the processing for estimating the gaze direction of the target person R in step S203.

The learned extractor 35 can appropriately extract the feature quantity 6021 (feature information 602) containing elements associated with the characteristics of the gaze of the target person R looking in a predetermined direction from the reference image 601. The learned combiner 36 can appropriately derive the feature quantity 604 containing elements associated with the characteristics of the gaze of the target person R looking in a predetermined direction and the true value for the predetermined direction based on the feature quantity 6021 and the true value information 603. This structure can thus appropriately estimate the gaze direction of the target person R based on the feature quantity 604 and the target image 63 with the learned estimation model 3.

4. Modifications

The embodiment of the present invention described in detail above is a mere example of the present invention in all aspects. The embodiment may be variously modified or altered without departing from the scope of the present invention. For example, the embodiment may be modified in the following forms. The same components as those in the above embodiment are hereafter given like numerals, and the operations that are the same as those in the above embodiment will not be described. The modifications described below may be combined as appropriate.

4.1

In the above embodiment, the camera S is used to obtain the calibration information 60. However, the sensor for measuring the gaze of the target person R may be another sensor. The sensor may be of any type that can measure the characteristics of the gaze of the target person R and may be selected as appropriate in each embodiment. The sensor may be, for example, a scleral contact lens with encapsulated coils or an ocular potential sensor. As in the above embodiment, the gaze estimation apparatus 2 may measure the gaze of the target person R with a sensor after an instruction is output to the target person R to look in a predetermined direction. The feature information 602 can be obtained from the sensing data obtained through this measurement. The feature information 602 may be obtained using, for example, the search coil method or the electrooculogram (FOG) method.

4.2

In the above embodiment, the estimation model 3 includes the extractor 31 and the estimator 32. The calibration information 60 includes the feature quantity 604 derived from the reference image 601 and the true value information 603 using the extractor 35 and the combiner 36. The estimator 32 receives an input of the feature quantity 604 derived by the combiner 36 and the feature quantity 64 associated with the target image 63. However, the estimation model 3 and the calibration information 60 may each have any other structure.

For example, the estimation model 3 may further include the combiner 36. In this case, the calibration information 60 may include feature information 602 and true value information 603. The processing in step S201 may include obtaining a reference image 601, inputting the reference image 601 into the extractor 35, and performing a computational operation of the extractor 35 to obtain the feature quantity 6021 (feature information 602) about the reference image 601 and to obtain the true value information 603. The processing in step S203 may further include deriving the feature quantity 604 based on the feature quantity 6021 and the true value information 603 using the combiner 36.

For example, the estimation model 3 may further include the extractor 35 and the combiner 36. In this case, the feature information 602 may include the reference image 601. The processing in step S201 may include obtaining the reference image 601 and the true value information 603. The calibration information 60 may include the reference image 601 and the true value information 603. The processing in step S203 may further include deriving the feature quantity 604 based on the reference image 601 and the true value information 603 using the extractor 35 and the combiner 36.

For example, the extractor 35 may be eliminated from the gaze estimation apparatus 2. In this case, the controller 21 may directly obtain the feature information 602. When, for example, the feature information 602 includes the feature quantity 6021, the process for extracting the feature quantity 6021 from the reference image 601 may be performed by another computer. The controller 21 may obtain the feature quantity 6021 from another computer. In another example, the feature information 602 may include the reference image 601. In this case, the combiner 36 may receive an input of the reference image 601 and the true value information 603.

Figure 9:
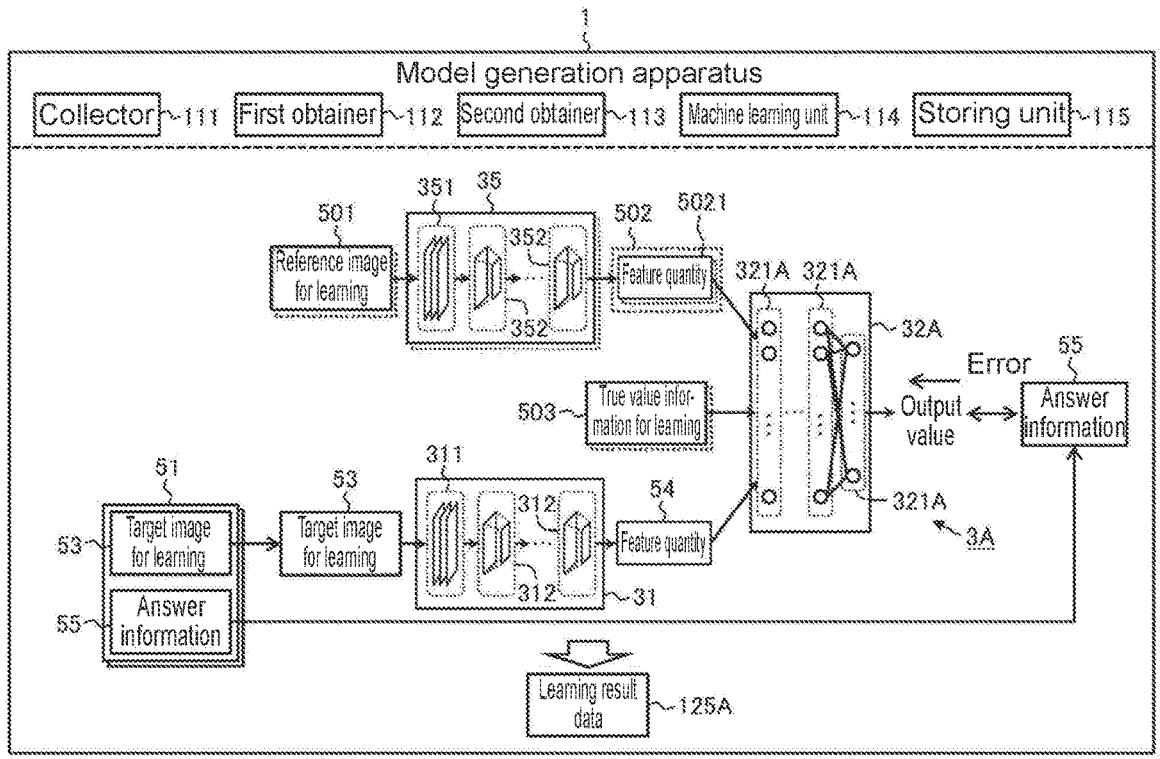
FIG. 9 is a schematic diagram illustrating a model generation apparatus according to a modification showing a software configuration.
Figure 10:
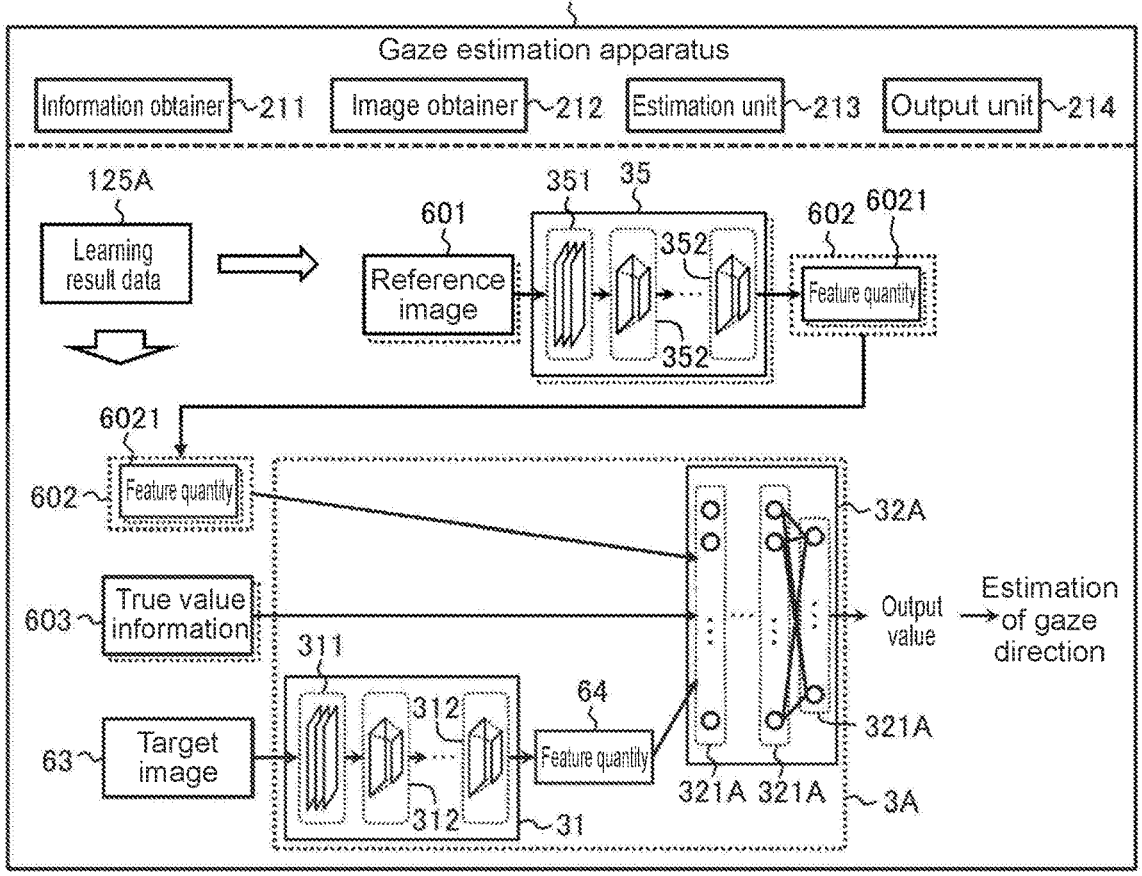
FIG. 10 is a schematic diagram illustrating a gaze estimation apparatus according to the modification showing a software configuration.

FIG. 9 is a schematic diagram of a model generation apparatus 1 for generating an estimation model 3A according to a modification showing its software configuration. FIG. 10 is a schematic diagram of a gaze estimation apparatus 2 using the estimation model 3A according to the first modification showing its software configuration. In the first modification, the combiner 36 is eliminated. In this case, the process for deriving the calibration feature quantity from the feature information and true value information is eliminated from the procedure performed by the model generation apparatus 1 and the gaze estimation apparatus 2. An estimator 32A receives an input of feature information, true value information, and a feature quantity associated with a target image. More specifically, the estimator 32A directly receives an input of the feature information and the true value information, instead of the calibration feature quantity. Except these, the apparatus according to the present modification has the same structure as in the above embodiment. The estimator 32A includes one or more fully-coupled layers 321A as in the above embodiment. The estimation model 3A includes the extractor 31 and the estimator 32A.

As shown in FIG. 9, the model generation apparatus 1 according to the first modification can generate the learned estimation model 3A (the extractor 31 and the estimator 32A) and the learned extractor 35 with the same procedure as in the above embodiment, except that the training process for the combiner 36 is eliminated as described above. In step S107, the controller 11 generates, as learning result data 125A, information about a learned estimation model 3A generated through machine learning and information about the extractor 35. The controller 11 stores the generated learning result data 125A into a predetermined storage area. The learning result data 125A may be provided to the gaze estimation apparatus 2 at an appropriate time.

Similarly, as shown in FIG. 10, the gaze estimation apparatus 2 can estimate the gaze direction of the target person R with the same procedure as in the above embodiment, except that the computational process of the above combiner 36 is eliminated. In step S201 above, the controller 21 obtains the reference image 601 and the true value information 603. The controller 21 inputs the obtained reference image 601 into the extractor 35 and performs a computational operation of the extractor 35. The controller 21 thus obtains, from the extractor 35, an output value corresponding to a feature quantity 6021 (feature information 602) associated with the reference image 601. In the first modification, the calibration information 60 may include the feature information 6021 (feature information 602) and the true value information 603.

In step S203 above, the controller 21 estimates the gaze direction of the target person R included in the obtained target image 63 using the learned estimation model 3A. More specifically, the controller 21 inputs the obtained target image 63 into the extractor 31 and performs a computational operation of the extractor 31. Through this computational operation, the controller 21 obtains, from the extractor 31, the feature quantity 64 associated with the target image 63. The controller 21 then inputs the feature quantity 6021 (feature information 602), the true value information 603, and the feature quantity 64 into the estimator 32A and performs a computational operation of the estimator 32A. Through this computational operation, the controller 21 obtains, from the estimator 32A, an output value corresponding to the estimation result of the gaze direction of the target person R included in the target image 63.

In the first modification as in the above embodiment, the gaze direction of the target person R can be appropriately estimated based on the feature information 602 (feature quantity 6021), the true value information 603, and the target image 63 in the learned estimation model 3A. The gaze direction of the target person R can be estimated with higher accuracy in step S203 using the feature information 602 and the true value information 603. When the process for estimating the gaze direction of the target person R is to be repeated, the feature quantity 6021 (feature information 602) derived in step S201 can be reused in each cycle. This accordingly increases the speed of the processing for estimating the gaze direction of the target person R in step S203.

In the first modification as well, the extractor 35 may be eliminated from the gaze estimation apparatus 2. In this case, the controller 21 may directly obtain the feature information 602 as in the above embodiment. When the feature information 602 includes the reference image 601, the estimator 32A receives an input of the reference image 601, the true value information 603, and the feature quantity 64.

Figure 11:
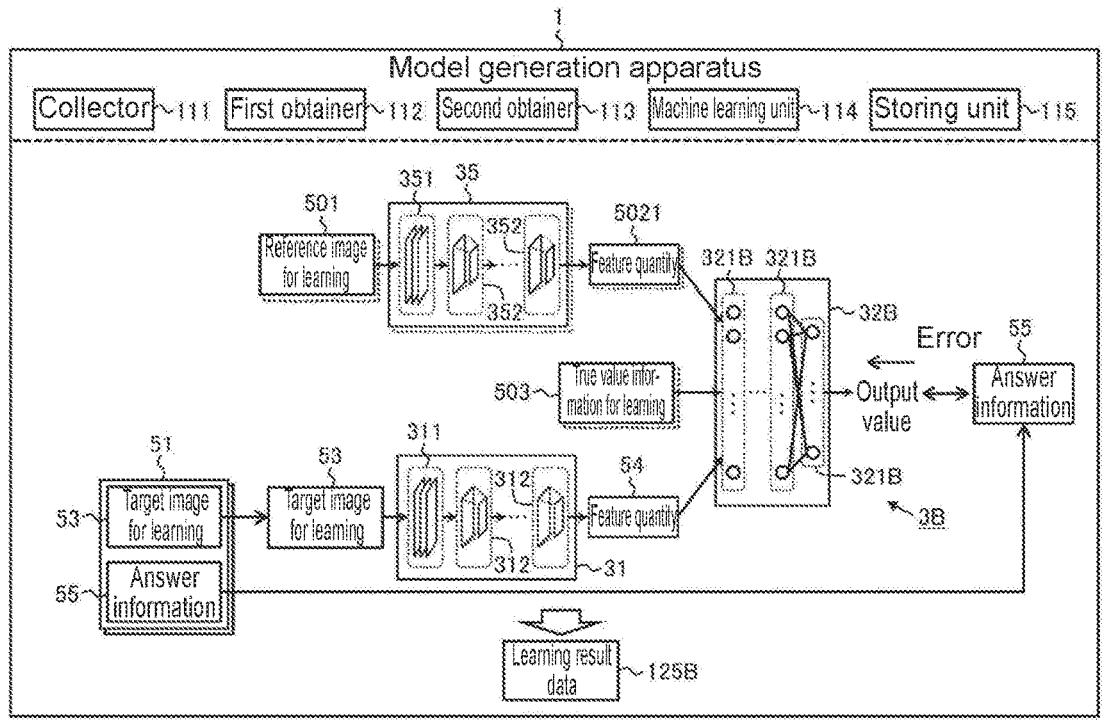
FIG. 11 is a schematic diagram illustrating a model generation apparatus according to a modification showing a software configuration.
Figure 12:
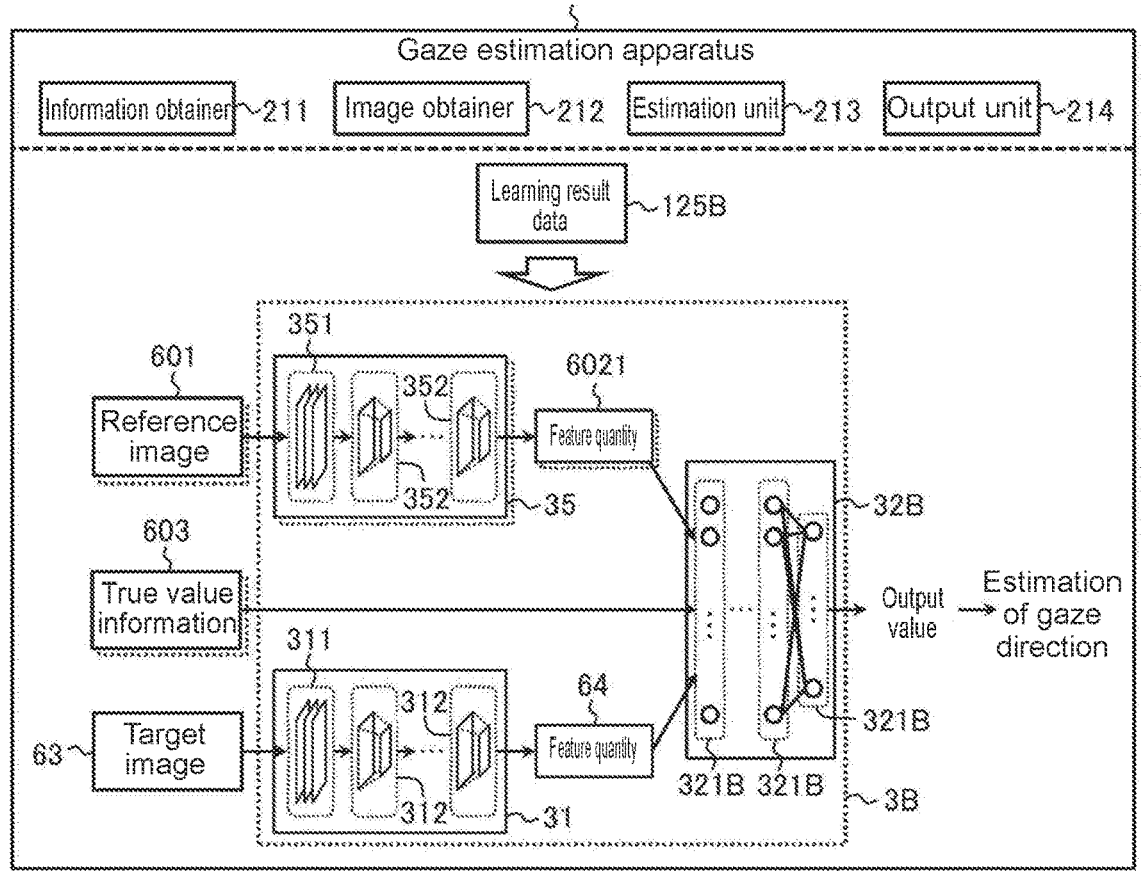
FIG. 12 is a schematic diagram illustrating a gaze estimation apparatus according to a modification showing a software configuration.

FIG. 11 is a schematic diagram of a model generation apparatus 1 that generates an estimation model 3B according to a second modification showing its software configuration. FIG. 12 is a schematic diagram of a gaze estimation apparatus 2 that uses an estimation model 3A according to the second modification showing its software configuration. In the second modification, an estimation model 3B further includes an extractor 35. More specifically, the estimation model 3B includes extractors (31, 35) and an estimator 32B. The feature information thus includes a reference image. Except these, the apparatus according to the present modification has the same structure as in the first modification. The estimator 32B has the same structure as the estimator 32A above. The estimator 32B includes one or more fully-coupled layers 321B as in the first modification.

In the second modification, as shown in FIG. 11, the model generation apparatus 1 can generate the learned estimation model 3B using the same procedure as in the first modification described above. In step S107, the controller 11 generates information about the learned estimation model 3B generated through machine learning as learning result data 125B. The controller 11 stores the generated learning result data 125B into a predetermined storage area. The learning result data 125B may be provided to the gaze estimation apparatus 2 at an appropriate time.

Similarly, as shown in FIG. 12, the gaze estimation apparatus 2 can estimate the gaze direction of the target person R with the same procedure as in the first modification. In step S201 above, the controller 21 obtains the reference image 601 and the true value information 603. In step S203, the controller 21 estimates the gaze direction of the target person R included in the obtained target image 63 using the learned estimation model 3B. More specifically, the controller 21 inputs the obtained target image 63 into the extractor 31 and performs a computational operation of the extractor 31. Through this computational operation, the controller 21 obtains, from the extractor 31, the feature quantity 64 associated with the target image 63. The controller 21 inputs the obtained reference image 601 into the extractor 35 and performs a computational operation of the extractor 35. The controller 21 thus obtains, from the extractor 35, an output value corresponding to a feature quantity 6021 associated with the reference image 601. The processing in the extractors (31, 35) may be performed in any order. The controller 21 then inputs the feature quantity 6021, the true value information 603, and the feature quantity 64 into the estimator 32B and performs a computational operation of the estimator 32B. Through this computational operation, the controller 21 obtains, from the estimator 32B, an output value corresponding to the estimation result of the gaze direction of the target person R included in the target image 63.

In the second modification as in the above embodiment, the gaze direction of the target person R can be appropriately estimated based on the reference image 601 (feature information), the true value information 603, and the target image 63 in the learned estimation model 3B. The gaze direction of the target person R can be estimated with higher accuracy in step S203 using the feature information and the true value information 603.

Figure 13A:
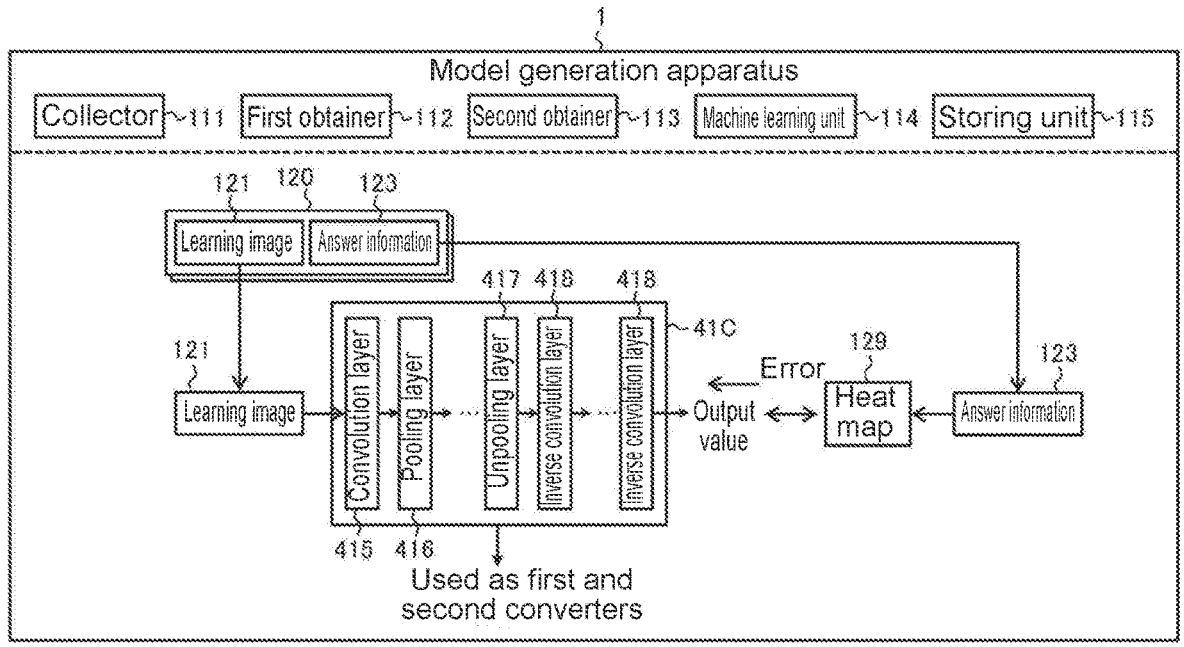
FIG. 13A is a schematic diagram illustrating a model generation apparatus according to a modification showing a software configuration.
Figure 13B:
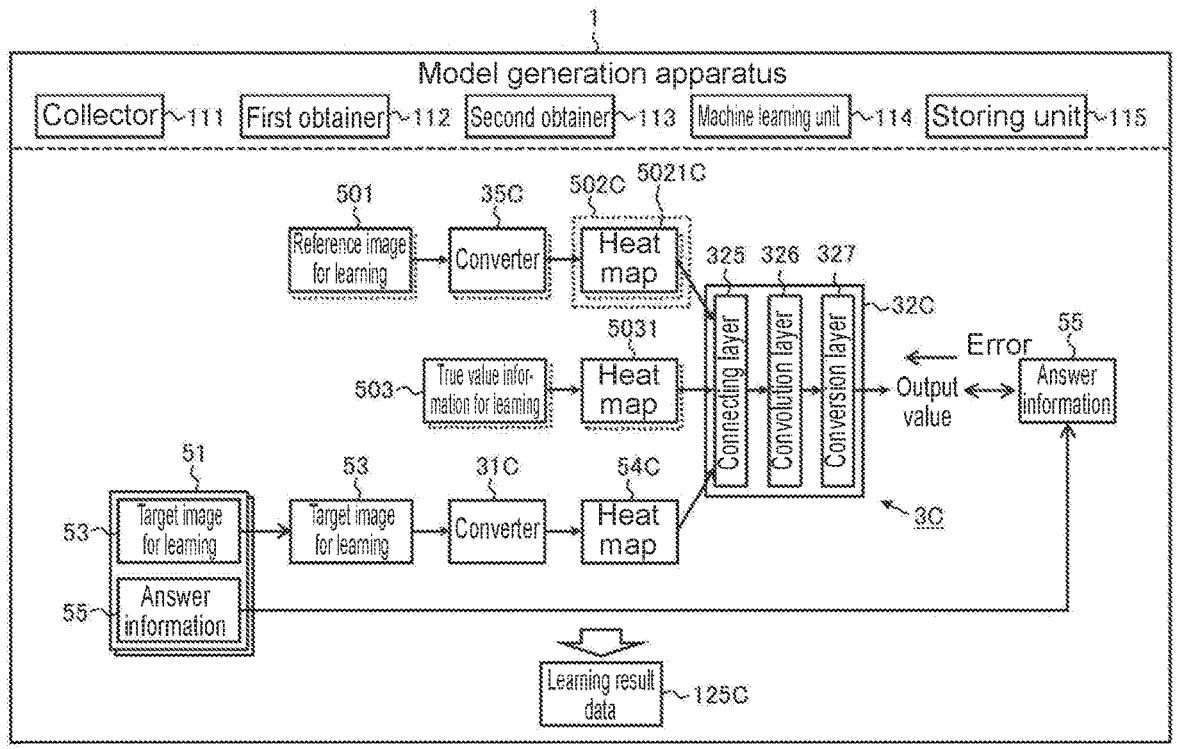
FIG. 13B is a schematic diagram illustrating a model generation apparatus according to a modification showing a software configuration.
Figure 14:
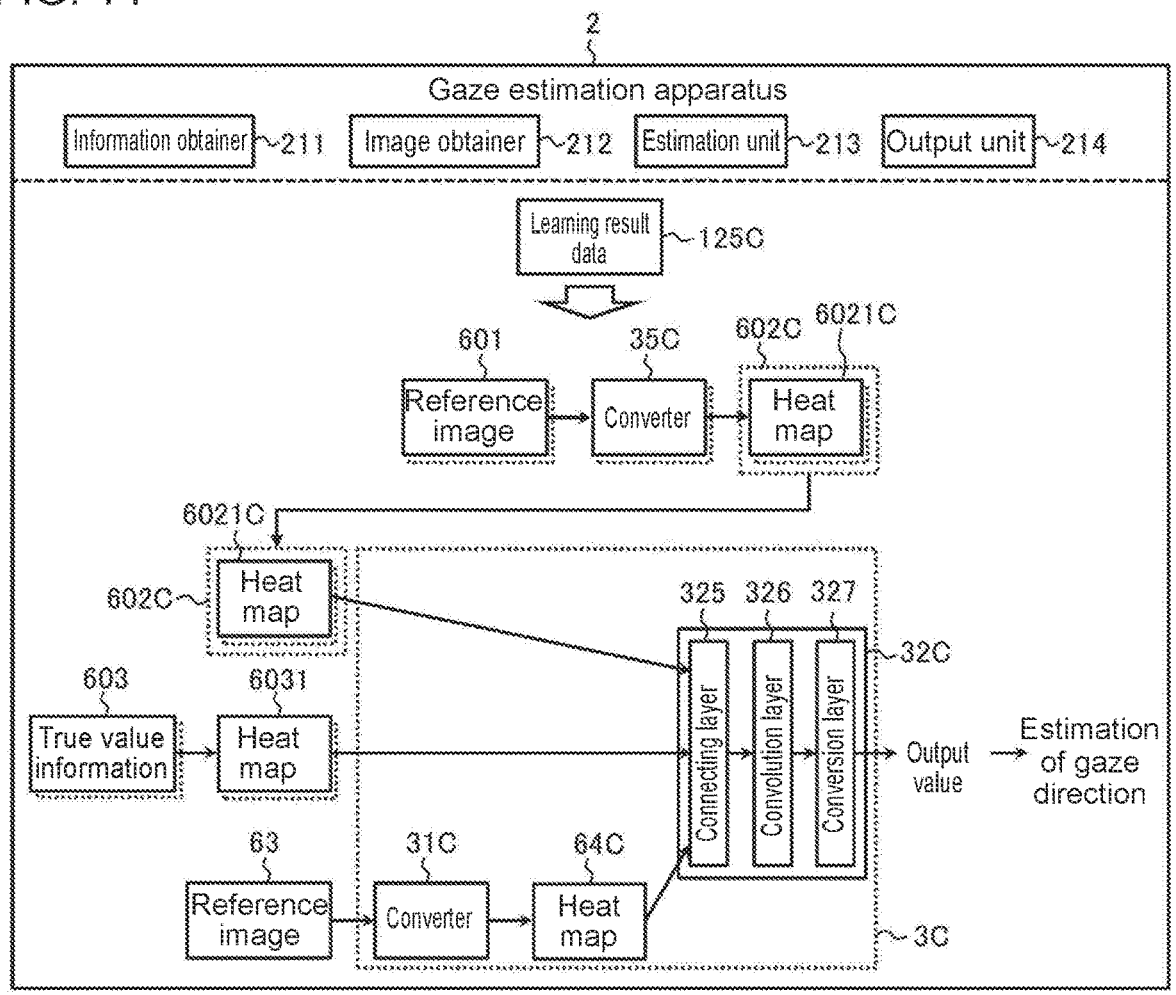
FIG. 14 is a schematic diagram illustrating a gaze estimation apparatus according to a modification showing a software configuration.

FIGS. 13A and 13B are schematic diagrams of the model generation apparatus 1 that generates an estimation model 3C according to a third modification showing its example software configuration. FIG. 14 is a schematic diagram of the gaze estimation apparatus 2 that uses the estimation model 3C according to the third modification showing its software configuration. In the third modification, a heat map is used to represent the gaze direction as one of the features. A heat map is an image representation of the gaze direction of a person. The value of each pixel in a heat map corresponds to, for example, the degree by which the person gazes at the position. When the sum of each pixel is normalized to 1, the value of each pixel can indicate the probability that the person is gazing at the position.

Thus, the extractors (31, 35, 41) can be replaced by the corresponding converters (31C, 35C, 41C) as shown in FIGS. 13A and 13B. The converter 31C is an example of a first converter. The converter 35C is an example of a second converter. Each converter (31C, 35C, 41C) receives an input image including the eye(s) of a person and outputs a heat map representing the gaze direction of the person derived from the input image. In other words, the converters (31C, 35C, 41C) can each convert an image including the eye(s) of the person into a heat map representing the gaze direction.

In the learning model 4, as shown in FIGS. 13A, the extractor 41 is replaced with the converter 41C, and the estimator 43 is eliminated. The converter 41C includes a convolution layer 415, a pooling layer 416, an unpooling layer 417, and an inverse convolution layer 418. The unpooling layer 417 performs a computational operation opposite to the pooling process performed by the pooling layer 416. The inverse convolution layer 418 performs an inverse computational operation opposite to the convolution operation of the convolution layer 415.

The number of layers 415 to 418 may be determined as appropriate in each embodiment. The unpooling layer 417 and the inverse convolution layer 418 are located nearer the output end than the convolution layer 415 and the pooling layer 416. In the example of FIG. 13A, the convolution layer 415 nearest the input end is an input layer, and the inverse convolution layer 418 nearest the output end is an output layer. However, the configuration of the converter 41C is not limited to the above example and may be selected as appropriate in each embodiment. The converter 41C may include other types of layers such as normalized layers or dropout layers. In the present modification as in the above embodiment, the converter 41C is first trained through machine learning, and the trained converter 41C is used as each converter (31C, 35C). The structure of each converter (31C, 35C) is based on the converter 41C. As in the above embodiment, the converters (31C, 35C) may be the same converter or may be separate converters.

In the present modification, as shown in FIGS. 13B and 14, the estimation model 3C includes a converter 31C and an estimator 32C. The feature information may include a heat map representing the gaze direction of the eyes looking in a predetermined direction derived from a reference image including the eyes of a person (target person R) looking in the predetermined direction. The estimator 32C receives an input of the heat map derived from the target image, the feature information, and the true value information, and outputs an output value corresponding to the estimation result of the gaze direction of the person included in the target image. In the present modification, the feature information may include a heat map representing the gaze direction of the eyes looking in a predetermined direction derived from a reference image. The true value information is converted into a heat map representing a true value in the predetermined direction. Receiving an input of a heat map, feature information, and true value information derived from a target image includes receiving an input of a heat map derived from a target image, a heat map (feature information) derived from a reference image, and a heat map derived from true value information.

In the example of FIGS. 13B and 14, the estimator 32C includes, in order from the input end, a connecting layer 325, a convolution layer 326, and a conversion layer 327. The connecting layer 325 connects input heat maps to one another. The conversion layer 327 converts an output obtained from the convolution layer 326 into the estimation result of the gaze direction. The connecting layer 325 and the conversion layer 327 may each include multiple neurons (nodes) as appropriate. However, the configuration of the estimator 32C is not limited to the above example and may be selected as appropriate in each embodiment. The estimator 32C may include other types of layers such as a pooling layer and a fully-coupled layer. Except these, the apparatus according to the present modification has the same structure as in the above embodiment. The model generation apparatus 1 generates a learned estimation model 3C using the same procedure as used in the above embodiment. The gaze estimation apparatus 2 also estimates the gaze direction of the target person R using the learned estimation model 3C with the same procedure as used in the above embodiment.

Procedure Performed by Model Generation Apparatus

In step S102, the controller 11 performs machine learning of the converter 41C using multiple datasets 120 as shown in FIG. 13A. In an example, the controller 11 first inputs a learning image 121 in each dataset 120 into the converter 41C and performs a computational operation of the converter 41C. The controller 11 thus obtains, from the converter 41C, an output value corresponding to a heat map resulting from conversion of the learning image 121.

The controller 11 also converts the corresponding answer information 123 into a heat map 129. A method for converting the answer information 123 into the heat map 129 may be selected as appropriate in each embodiment. For example, the controller 11 prepares an image of the same size as the heat map output by the converter 41C. Subsequently, the controller 11 places a predetermined distribution, such as a Gaussian distribution, in the prepared image having the center at a position corresponding to the true value for the gaze direction indicated by the answer information 123. The maximum value of the distribution may be determined as appropriate. This allows the answer information 123 to be converted into the heat map 129.

The controller 11 then calculates the error between the output value obtained from the converter 41C and the heat map 129. The machine learning processing in the subsequent steps may be the same as in the above embodiment. The controller 11 uses the error back propagation method to calculate an error in the value of each computational parameter of the converter 41C from the layer nearest the output end using the gradient of the error in the calculated output value.

The controller 11 adjusts, for each dataset 120, the value of each computational parameter used by the converter 41C through the above series of updating processing steps to reduce the sum of the calculated output values. The controller 11 may repeatedly adjust the value of each computational parameter used by the converter 41C until a predetermined condition is satisfied. Through the machine learning, the controller 11 can generate, for each dataset 120, the trained converter 41C trained to appropriately convert an image including the eye(s) of a person into a heat map representing the gaze direction of the eyes.

As shown in FIG. 13B, in step S103 above, the controller 11 uses the converter 41C as the converters (31C, 35C). In this manner, the controller 11 prepares a learning model including the estimation model 3C and the converter 35C.

In step S104 above, the controller 11 uses the converter 35C to obtain the feature information 502C for learning. More specifically, the controller 11 obtains the reference image 501 for learning and the true value information 503 for learning in the same manner as in the above embodiment. The controller 11 inputs the obtained reference image 501 for learning into the converter 35C and performs a computational operation of the converter 35C. Through this computational operation, the controller 11 obtains, from the converter 35C, an output value corresponding to a heat map 5021C for learning representing the gaze direction of the eyes looking in a predetermined direction derived from the reference image 501 for learning. In the present modification, the feature information 502C for learning includes the heat map 5021C. The controller 11 also converts the true value information 503 for learning into a heat map 5031. The conversion uses the same method as used for converting the above answer information 123 into the heat map 129. Through these computational operations, the controller 11 obtains calibration information for learning including the two heat maps (5021C, 5031). As in the above embodiment, the controller 11 may obtain the reference image 501 for learning and the true value information 503 for learning for each of multiple different predetermined directions. The controller 11 may then obtain heat maps (5021C, 5031) for the different predetermined directions through the computational operations. In step S105, the controller 11 further obtains multiple learning datasets 51 in the same manner as in the above embodiment.

In step S106 above, the controller 11 performs machine learning of the estimation model 3 using the obtained multiple learning datasets 51. In the present modification, the controller 11 first inputs a target image 53 for learning in each learning dataset 51 into the converter 31C and performs a computational operation of the converter 31C. Through this computational operation, the controller 11 obtains, from the converter 31C, an output value corresponding to a heat map 54C resulting from conversion of the target image 53 for learning. The controller 11 inputs each heat map (5021C, 5031, 54C) into the estimator 32C and performs a computational operation of the estimator 32C. Through this computational operation, the controller 11 obtains, from the estimator 32C, an output value corresponding to the estimation result of the gaze direction of the subject included in the target image 53 for learning.

The controller 11 then calculates the error between the output value obtained from the estimator 32C and the corresponding answer information 55. The machine learning processing in the subsequent steps may be the same as in the above embodiment. The controller 11 uses the error back propagation method to calculate an error in the value of each computational parameter of the learning model using the gradient of the error in the calculated output value from the layer nearest the output end and updates the value of each computational parameter based on the calculated error.

The controller 11 thus adjusts the values of the computational parameters to reduce the sum of errors in the calculated output values for the reference image 501 for learning, the true value information 503 for learning, and each learning dataset 51 by performing the series of updating processing steps while performing the computational operation of the converter 35C and the computational operation of the estimation model 3C. The controller 11 may repeatedly adjust the value of each computational parameter for the learning model until a predetermined condition is satisfied. Through the machine learning, the controller 11 can generate, for each learning dataset 51, the trained learning model trained to appropriately estimate the gaze direction of a person using the reference image 501 for learning, the true value information 503 for learning, and the target image 53 for learning.

As described in the above embodiment, the subjects as the sources of reference images 501 for learning, true value information 503 for learning, and multiple learning datasets 51 may be identified to allow use of the reference image 501 for learning, the true value information 503 for learning, and the multiple learning datasets 51 derived from the same subject in the machine learning of the learning model. The heat map 5031 obtained from the true value information 503 for learning may be reused while the values of the computational parameters are being adjusted repeatedly. In this case, converting the true value information 503 for learning into the heat map 5031 may be eliminated. The true value information 503 for learning may be pre-converted into the heat map 5031. The converters (31C, 35C) are each trained to convert an image including the eye(s) of the person into a heat map representing the gaze direction of the eyes through the machine learning of the converter 41C. Thus, the process for adjusting the value of each computational parameter used by the converters (31C, 35C) may be eliminated from the above updating process. In this case, the computational result of each converter (31C, 35C) may be reused during repeated adjustments of the value of each computational parameter. More specifically, the computational operation for deriving each heat map (5021C, 5031) may not be performed repeatedly.

In step S107, the controller 11 generates information about the learned estimation model 3C generated through machine learning and information about the converter 35C as learning result data 125C. The controller 11 stores the generated learning result data 125C into a predetermined storage area. The learning result data 125C may be provided to the gaze estimation apparatus 2 at an appropriate time.

Procedure Performed by Gaze Estimation Apparatus

In the present modification, as shown in FIG. 14, the information obtainer 211 holding the learning result data 125C includes the learned converter 35C, and the estimation unit 213 holding the learning result data 125C includes the learned estimation model 3C. The learned estimation model 3C includes the learned converter 31C and the learned estimator 32C.

In step S201 above, the controller 21 obtains the reference image 601 and the true value information 603. The controller 21 inputs the obtained reference image 601 for learning into the learned converter 35C and performs a computational operation of the converter 35C. Through this computational operation, the controller 21 obtains, from the learned converter 35C, an output value corresponding to a heat map 6021C representing the gaze direction of the eyes looking in a predetermined direction derived from the reference image 601. The heat map 6021C is an example of a second heat map. In the present modification, the feature information 602C includes the heat map 6021C. The controller 21 also converts the true value information 603 into a heat map 6031 representing a true value for the predetermined direction. The conversion uses the same method as used for converting the above answer information 123 into the heat map 129. The heat map 6031 is an example of a third heat map. The controller 21 obtains calibration information including the heat maps (6021C, 6031). As in the above embodiment, the controller 21 may obtain the reference image 601 for learning for each of the different predetermined directions and the true value information 603. The controller 21 may then obtain the heat maps (6021C, 6031) for the different predetermined directions through the computational operations.

In step S203, the controller 21 uses the learned estimation model 3C to estimate the gaze direction of the target person R included in the obtained target image 63 using the learned estimation model 3C. More specifically, the controller 21 inputs the obtained target image 63 into the learned converter 31C and performs a computational operation of the converter 31C. Through this computational operation, the controller 21 obtains, from the learned converter 31C, an output value corresponding to a heat map 64C representing the gaze direction of the target person R derived from the target image 63. The heat map 64C is an example of a first heat map. The controller 21 inputs the heat maps (6021C, 6031, 64) into the learned estimator 32C and performs a computational operation of the estimator 32C. Through this computational operation, the controller 21 obtains, from the learned estimator 32C, an output value corresponding to the estimation result of the gaze direction of the target person R included in the target image 63.

In the third modification as in the above embodiment, the gaze direction of the target person R can be appropriately estimated based on the feature information 602C, the true value information 603, and the target image 63 in the learned estimation model 3C. The gaze direction of the target person R can be estimated with higher accuracy in step S203 using the feature information 602C and the true value information 603. A fully-coupled layer tends to have a larger number of parameters than a convolutional layer, and thus can have lower computing speed. The structure according to the third modification may not include fully-coupled layers for the converters (31C, 35C) and the estimator 32C. This can reduce the volume of information used by the estimation model 3C, thus increasing the speed of the information processing for the estimation model 3C. Further, this structure uses a common heat map format as the data format used at the input end to simplify the structure of the estimator 32C, thus allowing the estimator 32C to easily integrate relevant pieces of information (the feature information, the true value information, and the target image) and to have higher estimation accuracy.

In the third embodiment, the estimation model 3C may have any other structure. The true value information 603 may be input directly into estimator 32C without being converted to the heat map 6031. The feature information 602C may be input into the estimator 32C in a data format different from the data format for the heat map 6021C. For example, the feature information 602C may be input into the estimator 32C as the feature quantity, as in the above embodiment. The feature information 602C and the true value information 603 may be combined before being input into the estimator 32C.

The estimator 32C may also output the results of the gaze direction estimation in the form of a heat map. In this case, the conversion layer 327 may be eliminated from the estimator 32C. The controller 21 may identify the gaze direction of the target person R in accordance with the center of gravity of the heat map or the position of the pixel with the maximum value. Estimating the heat map with true values using a heat map for learning is easier than estimating numerical values from a heat map for learning and allows generation of a learned model with higher estimation accuracy. The estimation model 3C allows estimation of the gaze direction with higher accuracy using a heat map as the data format both at the input end and at the output end. In an additional example described below, an organ point on the face of the target person R is detected together with the gaze direction. In this case, recent detection methods may use a heat map format to express the detection results of facial organ points. In this case, a heat map showing the results of the gaze direction estimation can be merged with a heat map showing the detection results of facial organ points to output these results as a single display. Further, these estimation models may be a single model, thus enhancing real-time performance. In this modification as well, at least one of the true value information 603 or the feature information 602C may be input into the estimator 32C in a format different from a heat map.

For example, the converter 35C may be eliminated from the gaze estimation apparatus 2. In this case, the controller 21 may directly obtain the feature information 602C. When, for example, the feature information 602C includes the heat map 6021C, the process for converting the reference image 601 into the heat map 6021C may be performed by another computer. The controller 21 may obtain the heat map 6021C from another computer. In another example, the feature information 602C may include the reference image 601. In this case, the estimator 32C may receive an input of the reference image 601.

4.3

In the above embodiment, each extractor (31, 35, 41) uses a convolutional neural network. Each estimator (32, 43) and the combiner 36 each use a fully-coupled neural network. However, the neural network included in each of the extractors (31, 35, 41), each of the estimators (32, 43), and the combiner 36 may be of any other type selected as appropriate in each embodiment. For example, a fully-coupled neural network or a recurrent neural network may be used for each of the extractors (31, 35, 41). For example, each of the estimators (32, 43) and the combiner 36 may use a convolutional neural network or a recurrent neural network.

The learning model 30 may have fragmented components. A single neural network may include a combination of two or more components. For example, the estimation model 3 (the extractor 31 and the estimator 32) may be included in a single neural network.

The type of a machine learning model included in each of the extractors (31, 35, 41), each of the estimators (32, 43), and the combiner 36 may be different from a neural network. Instead of a neural network, for example, a support vector machine, a regression model, or a decision tree model may be used for each of the extractors (31, 35, 41), each of the estimators (32, 43), and the combiner 36.

In the above embodiment, the learned estimation model 3, the extractor 35, and the combiner 36 may be generated by another computer other than the model generation apparatus 1. When machine learning of the learning model 4 is performed by another computer, the processing in step S102 may be eliminated from the procedure performed by the model generation apparatus 1. When machine learning of the learning model 30 is performed by another computer, the processing in steps S103 to S107 may be eliminated from the procedure performed by the model generation apparatus 1. The first obtainer 112 and the second obtainer 113 may also be eliminated from the software configuration of the model generation apparatus 1. When the results from the machine learning of the model generation apparatus 1 are not used by the gaze estimation apparatus 2, the model generation apparatus 1 may be eliminated from the gaze estimation system 100.

4.4

In the above embodiment, the calibration information 60 may be provided in advance by, for example, performing the processing in step S201 above during the initial setting. In this case, the processing in step S201 may be eliminated from the procedure performed by the gaze estimation apparatus 2. When the calibration information 60 is not changed after being obtained, the learned extractor 35 and the learned combiner 36 may be eliminated or removed from the gaze estimation apparatus 2. At least part of the process for obtaining the calibration information 60 may be performed by another computer. In this case, the gaze estimation apparatus 2 may obtain the calibration information 60 by obtaining the computational result of another computer.

In the above embodiment, the gaze estimation apparatus 2 may not repeat the process for estimating the gaze direction. In this case, the processing in step S205 may be eliminated from the procedure of the gaze estimation apparatus 2.

In the above embodiment, the dataset 120 may not be used to obtain each learning dataset 51 and the calibration information 50 for learning. When machine learning of the learning model 4 is performed by another computer, the processing in step S101 may be eliminated from the procedure performed by the model generation apparatus 1. The collector 111 may be eliminated from the software configuration of the model generation apparatus 1.

REFERENCE SIGNS LIST 1 model generation apparatus
11 controller
12 storage
13 communication interface
14 external interface
15 input device
16 output device
17 drive
111 data collector
112 first obtainer
113 second obtainer
114 machine learning unit
115 storing unit
120 dataset
121 learning image
123 answer information
125 learning result data
81 model generation program
91 memory medium
2 gaze estimation apparatus
21 controller
22 storage
23 communication interface
24 external interface
25 input device
26 output device
27 drive
211 information obtainer
212 image obtainer
213 estimation unit
214 output unit
261 display
M marker
82 gaze estimation program
92 storage medium
30 learning model
3 estimation model
31 extractor (first extractor)
311 convolutional layer
312 pooling layer
32 estimator
321 fully-coupled layer
35 extractor (second extractor)
351 convolutional layer
352 pooling layer
36 combiner
361 fully-coupled layer
4 learning model
41 extractor
411 convolutional layer
412 pooling layer
43 estimator
431 fully-coupled layer
50 calibration information for learning
501 reference image for learning
502 feature information for learning
5021 feature quantity
503 true value information for learning
504 feature quantity
51 learning dataset
53 target image for learning
54 feature quantity
55 answer information
60 calibration information
601 reference image
602 feature information
6021 feature quantity (second feature quantity)
603 true value information
604 feature quantity (calibration feature quantity)

63 target image
64 feature quantity (first feature quantity)
R target person
S camera

The invention claimed is:

1. A gaze estimation apparatus comprising a processor configured with a program to perform operations comprising:
 obtaining calibration information comprising feature information and true value information, the feature information being about a gaze of an eye of a target person looking in a predetermined direction, the true value information indicating a true value for the predetermined direction in which the eye of the target person is looking;
 obtaining a target image comprising the eye of the target person;
 estimating a gaze direction of the target person comprised in the target image using a learned estimation model generated through machine learning, the learned estimation model being trained through the machine learning to output, in response to an input of calibration information for learning and a target image for learning obtained from a subject, an output value fitting answer information indicating a true value of a gaze direction of the subject comprised in the target image for learning, estimating the gaze direction comprises inputting the obtained target image and the obtained calibration information into the learned estimation model and performing a computational operation of the learned estimation model to obtain, from the learned estimation model, an output value corresponding to a result from estimating the gaze direction of the target person comprised in the target image; and
 outputting information about the result from estimating the gaze direction of the target person, wherein
 the learned estimation model is trained by obtaining a plurality of learning datasets each comprising a target image for learning comprising the eye of the subject and answer information indicating the true value for the gaze direction of the subject comprised in the respective target image for learning, and for each dataset of the plurality of learning datasets, performing the machine learning of the estimation model to output the output value fitting a corresponding piece of the answer information.

2. The gaze estimation apparatus according to claim 1, wherein
 the calibration information comprises the feature information and the true value information corresponding to each of a plurality of different predetermined directions.

3. The gaze estimation apparatus according to claim 2, wherein
 the feature information and the true value information being comprised in the calibration information comprises a calibration feature quantity about calibration derived from combining the feature information and the true value information,
 the learned estimation model comprises a first extractor and an estimator, and
 performing the computational operation of the learned estimation model comprises
  inputting the obtained target image into the first extractor and performing a computational operation of the first extractor to obtain, from the first extractor, an output value corresponding to a first feature quantity for the target image, and
  inputting the calibration feature quantity and the obtained first feature quantity into the estimator and performing a computational operation of the estimator.

4. The gaze estimation apparatus according to claim 2, wherein
 the learned estimation model comprises a first extractor and an estimator, and
 the processor is configured with the program to perform operation such that performing the computational operation of the learned estimation model comprises
  inputting the obtained target image into the first extractor and performing a computational operation of the first extractor to obtain, from the first extractor, an output value corresponding to a first feature quantity for the target image, and
  inputting the feature information, the true value information, and the obtained first feature quantity into the estimator and performing a computational operation of the estimator.

5. The gaze estimation apparatus according to claim 2, wherein
 the feature information comprises a reference image comprising the eye of the target person looking in the predetermined direction,
 the learned estimation model comprises a first extractor, a second extractor, and an estimator, and
 the processor is configured with the program to perform operation such that performing the computational operation of the learned estimation model comprises
  inputting the obtained target image into the first extractor and performing a computational operation of the first extractor to obtain, from the first extractor, an output value corresponding to a first feature quantity for the target image,
  inputting the reference image into the second extractor and performing a computational operation of the second extractor to obtain, from the second extractor, an output value corresponding to a second feature quantity for the reference image, and
  inputting the obtained first feature quantity, the obtained second feature quantity, and the true value information into the estimator and performing a computational operation of the estimator.

6. The gaze estimation apparatus according to claim 2, wherein
 the learned estimation model comprises a first converter and an estimator, and
 the processor is configured with the program to perform operation such that performing the computational operation of the learned estimation model comprises
  inputting the target image into the first converter and performing a computational operation of the first converter to obtain, from the first converter, an output value corresponding to a first heat map representing the gaze direction of the target person, and
  inputting the obtained first heat map, the feature information, and the true value information into the estimator and performing a computational operation of the estimator.

7. The gaze estimation apparatus according to claim 2, wherein
 the processor is configured with the program to perform operation such that obtaining the target image is repeatedly performed, and estimating the gaze direction of the target person is repeatedly performed.

8. The gaze estimation apparatus according to claim 1, wherein
the feature information and the true value information comprised in the calibration information comprises a calibration feature quantity about calibration derived from combining the feature information and the true value information,
the learned estimation model comprises a first extractor and an estimator, and
the processor is configured with the program to perform operations such that estimating the gaze direction comprises performing the computational operation of the learned estimation model by performing operations comprising
inputting the obtained target image into the first extractor and performing a computational operation of the first extractor to obtain, from the first extractor, an output value corresponding to a first feature quantity for the target image, and
inputting the calibration feature quantity and the obtained first feature quantity into the estimator and performing a computational operation of the estimator.

9. The gaze estimation apparatus according to claim 8, wherein
the feature information comprises a second feature quantity associated with a reference image comprising the eye of the target person looking in the predetermined direction,
the processor is configured with the program to perform operation such that obtaining calibration information further comprises
performing a computation operation,
obtaining the second feature quantity,
obtaining the true value information, and
inputting the obtained second feature quantity and the true value information and performing the computational operation to obtain an output value corresponding to the calibration feature quantity.

10. The gaze estimation apparatus according to claim 9, wherein
the processor is configured with the program to perform operation such that
obtaining calibration information further comprises
performing a computation operation, and
obtaining the second feature quantity comprises
obtaining the reference image, and
inputting the obtained reference image and performing the computational operation to obtain an output value corresponding to the second feature quantity.

11. The gaze estimation apparatus according to claim 1, wherein
the learned estimation model comprises a first extractor and an estimator, and
the processor is configured with the program to perform operation such that performing the computational operation of the learned estimation model comprises
inputting the obtained target image into the first extractor and performing a computational operation of the first extractor to obtain, from the first extractor, an output value corresponding to a first feature quantity for the target image, and
inputting the feature information, the true value information, and the obtained first feature quantity into the estimator and performing a computational operation of the estimator.

12. The gaze estimation apparatus according to claim 11, wherein
the feature information comprises a second feature quantity associated with a reference image comprising the eye of the target person looking in the predetermined direction,
and
the processor is configured with the program to perform operation such that obtaining the calibration information comprises
obtaining the reference image,
inputting the obtained reference image into a second extractor and performing a computational operation of the second extractor to obtain, from the second extractor, an output value corresponding to a second feature quantity, and
obtaining the true value information.

13. The gaze estimation apparatus according to claim 1, wherein
the feature information comprises a reference image comprising the eye of the target person looking in the predetermined direction,
the learned estimation model comprises a first extractor, a second extractor, and an estimator, and
the processor is configured with the program to perform operation such that performing the computational operation of the learned estimation model comprises
inputting the obtained target image into the first extractor and performing a computational operation of the first extractor to obtain, from the first extractor, an output value corresponding to a first feature quantity for the target image,
inputting the reference image into the second extractor and performing a computational operation of the second extractor to obtain, from the second extractor, an output value corresponding to a second feature quantity for the reference image, and
inputting the obtained first feature quantity, the obtained second feature quantity, and the true value information into the estimator and performing a computational operation of the estimator.

14. The gaze estimation apparatus according to claim 1, wherein
the learned estimation model comprises a first converter and an estimator, and
the processor is configured with the program to perform operation such that performing the computational operation of the learned estimation model comprises
inputting the target image into the first converter and performing a computational operation of the first converter to obtain, from the first converter, an output value corresponding to a first heat map representing the gaze direction of the target person, and
inputting the obtained first heat map, the feature information, and the true value information into the estimator and performing a computational operation of the estimator.

15. The gaze estimation apparatus according to claim 14, wherein
the feature information comprises a second heat map representing the gaze direction of an eye in the predetermined direction, and the second heat map is derived from a reference image comprising the eye of the target person looking in the predetermined direction, the processor is configured with the program to perform operation such that obtaining the calibration information comprises obtaining the reference image, inputting the obtained reference image into a second converter and performing a computational operation of the second converter to obtain, from the second converter, an output value corresponding to the second heat map, obtaining the true value information, converting the true value information into a third heat map associated with a true value for the predetermined direction, and inputting the first heat map, the feature information, and the true value information into the estimator comprises inputting the first heat map, the second heat map, and the third heat map into the estimator.

16. The gaze estimation apparatus according to claim 1, wherein the processor is configured with the program to perform operation such that obtaining the target image is repeatedly performed, and estimating the gaze direction of the target person is repeatedly performed.

17. The gaze estimation apparatus according to claim 1, wherein the processor is configured with the program to perform operation such that obtaining the calibration information comprises obtaining the calibration information by measuring a gaze of the target person with a sensor after outputting an instruction to the target person to look in the predetermined direction.

18. A gaze estimation method implementable by a computer, the method comprising:

obtaining calibration information comprising feature information and true value information, the feature information being about a gaze of an eye of a target person looking in a predetermined direction, the true value information indicating a true value for the predetermined direction in which the eye of the target person is looking;

obtaining a target image comprising the eye of the target person;

estimating a gaze direction of the target person comprised in the target image using a learned estimation model generated through machine learning, the learned estimation model being trained through the machine learning to output, in response to an input of calibration information for learning and a target image for learning obtained from a subject, an output value fitting answer information indicating a true value of a gaze direction of the subject comprised in the target image for learning, estimating the gaze direction comprising inputting the obtained target image and the obtained calibration information into the learned estimation model and performing a computational operation of the learned estimation model to obtain, from the learned estimation model, an output value corresponding to a result from estimating the gaze direction of the target person comprised in the target image; and outputting information about the result from estimating the gaze direction of the target person, wherein the learned estimation model is trained by obtaining a plurality of learning datasets each comprising a target image for learning comprising the eye of the subject and answer information indicating the true value for the gaze direction of the subject comprised in the respective target image for learning, and for each dataset of the plurality of learning datasets, performing the machine learning of the estimation model to output the output value fitting a corresponding piece of the answer information.

19. A model generation apparatus comprising a processor configured with a program to perform operations comprising:

obtaining calibration information for learning comprising feature information for learning and true value information for learning, the feature information being about a gaze of an eye of a subject looking in a predetermined direction, the true value information indicating a true value for the predetermined direction in which the eye of the subject is looking;

obtaining a plurality of learning datasets, each of the plurality of learning datasets comprising a target image for learning comprising the eye of the subject and answer information indicating a true value for a gaze direction of the subject comprised in the target image for learning; and performing machine learning of an estimation model using the obtained plurality of learning datasets, the machine learning comprising training the estimation model to output, in response to an input of the target image for learning and the calibration information for learning, an output value fitting a corresponding piece of the answer information for each of the plurality of learning datasets.

20. A model generation method implementable by a computer, the method comprising:

obtaining calibration information for learning comprising feature information for learning and true value information for learning, the feature information being about a gaze of an eye of a subject looking in a predetermined direction, the true value information indicating a true value for the predetermined direction in which the eye of the subject is looking;

obtaining a plurality of learning datasets, each of the plurality of learning datasets comprising a target image for learning comprising the eye of the subject and answer information indicating a true value for a gaze direction of the subject comprised in the target image for learning; and performing machine learning of an estimation model using the obtained plurality of learning datasets, the machine learning comprising training the estimation model to output, in response to an input of the target image for learning and calibration information for learning, an output value fitting a corresponding piece of the answer information for each of the plurality of learning datasets.

* * * * *